US00RE47863E

(19) United States
(12) Reissued Patent
Shiflet et al.

(10) Patent Number: US RE47,863 E
(45) Date of Reissued Patent: Feb. 18, 2020

(54) NON-FERROMAGNETIC AMORPHOUS STEEL ALLOYS CONTAINING LARGE-ATOM METALS

(75) Inventors: Gary J. Shiflet, Charlottesville, VA (US); S. Joseph Poon, Charlottesville, VA (US); Xiaofeng Gu, Wuxi (CN)

(73) Assignee: University of Virginia Patent Foundation, Charlottesville, VA (US)

(21) Appl. No.: 13/560,180

(22) Filed: Jul. 27, 2012

Related U.S. Patent Documents

Reissue of:
(64) Patent No.: 7,763,125
Issued: Jul. 27, 2010
Appl. No.: 11/313,595
Filed: Dec. 21, 2005

U.S. Applications:
(63) Continuation-in-part of application No. 10/559,002, filed as application No. PCT/US2004/016442 on May 25, 2004.

(60) Provisional application No. 60/638,259, filed on Dec. 22, 2004, provisional application No. 60/546,761, filed on Feb. 23, 2004, provisional application No. 60/513,612, filed on Oct.
(Continued)

(51) Int. Cl.
*C22C 45/02* (2006.01)

(52) U.S. Cl.
CPC ..... *C22C 45/02* (2013.01)

(58) Field of Classification Search
None
See application file for complete search history.

(56) References Cited

U.S. PATENT DOCUMENTS 2,535,068 A 12/1950 Johnson
2,853,040 A 9/1958 Grillo
(Continued)

FOREIGN PATENT DOCUMENTS

CN 1321056 * 11/2001
EP 0713925 A 5/1996
(Continued)

OTHER PUBLICATIONS

V. Ponnambalam el al., "Fe-Based Bulk Metallic Glasses with Diameter Thickness Larger than One Centimeter", Journal of Materials Research, 2004, p. 1320-1323, vol. 19, No. 5, Materials Research Society.*
(Continued)

*Primary Examiner* — Sean E Vincent
(74) *Attorney, Agent, or Firm* — Robert J. Decker; Dorsey & Whitney LLP

(57) ABSTRACT

The present invention relates to novel non-ferromagnetic amorphous steel alloys represented by the general formula: Fe—Mn-(Q)-B-M, wherein Q represents one or more elements selected from the group consisting of Sc, Y, Ce, Pr, Nd, Pm, Sm, Eu, Gd, Tb, Dy, Ho, Er, Tm, Yb and Lu, and M represents one or more elements selected from the group consisting of Cr, Co, Mo, C and Si. Typically the atomic percentage of the Q constituent is 10 or less. An aspect is to utilize these amorphous steels as coatings, rather than strictly bulk structural applications. In this fashion any structural metal alloy can be coated by various technologies by these alloys for protection from the environment. The resultant structures can utilize surface and bulk properties of the amorphous alloy.

49 Claims, 17 Drawing Sheets

Related U.S. Application Data

23, 2003, provisional application No. 60/475,185, filed on Jun. 2, 2003.

(56) References Cited

U.S. PATENT DOCUMENTS

| | | | | |
|---|---|---|---|---|
| 3,986,867 | A * | 10/1976 | Masumoto et al. | 148/403 |
| 4,053,330 | A | 10/1977 | Henricks | |
| 4,061,815 | A | 12/1977 | Poole | |
| 4,067,732 | A | 1/1978 | Ray | |
| 4,268,564 | A | 5/1981 | Narasimhan | |
| 4,353,305 | A | 10/1982 | Moreau | |
| 4,365,994 | A | 12/1982 | Ray | |
| 4,374,665 | A | 2/1983 | Koon | |
| 4,409,043 | A | 10/1983 | Koon | |
| 4,562,951 | A | 1/1986 | Cytron | |
| 4,584,034 | A | 4/1986 | Hagiwara | |
| 4,650,712 | A | 3/1987 | Hirose | |
| 4,676,168 | A | 6/1987 | Cotton | |
| 4,704,169 | A | 11/1987 | Kimura | |
| 4,802,931 | A * | 2/1989 | Croat | H01F 1/057 148/302 |
| 4,964,927 | A | 10/1990 | Shiflet | |
| 5,228,349 | A | 7/1993 | Gee | |
| 5,372,657 | A | 12/1994 | Hanaue | |
| 5,376,191 | A * | 12/1994 | Roman et al. | 148/403 |
| 5,431,754 | A | 7/1995 | Fujiwara | |
| 5,499,156 | A | 3/1996 | Bentley | |
| 5,522,948 | A | 6/1996 | Sawa | |
| 5,567,251 | A | 10/1996 | Peker | |
| 5,604,403 | A | 2/1997 | Levy | |
| 5,626,691 | A | 5/1997 | Li | |
| 5,728,968 | A | 3/1998 | Buzzett | |
| 5,732,771 | A | 3/1998 | Moore | |
| 5,738,733 | A | 4/1998 | Inoue | |
| 5,797,443 | A | 8/1998 | Lin | |
| 5,820,963 | A | 10/1998 | Lu | |
| 5,866,254 | A | 2/1999 | Peker | |
| 5,868,077 | A | 2/1999 | Kuznetsov | |
| 5,896,642 | A | 4/1999 | Peker | |
| 5,961,745 | A | 10/1999 | Inoue | |
| 5,976,274 | A | 11/1999 | Inoue | |
| 6,010,580 | A | 1/2000 | Dandliker | |
| 6,057,766 | A | 5/2000 | O'Handley | |
| 6,086,651 | A * | 7/2000 | Mizushima et al. | 75/246 |
| 6,172,589 | B1 | 1/2001 | Fujita | |
| 6,280,536 | B1 | 8/2001 | Inoue | |
| 6,284,061 | B1 | 9/2001 | Inoue | |
| 6,357,332 | B1 | 3/2002 | Vecchio | |
| 6,374,899 | B1 * | 4/2002 | Yamaguchi et al. | 164/132 |
| 6,446,558 | B1 | 9/2002 | Peker | |
| 6,505,571 | B1 | 1/2003 | Critchfield | |
| 6,515,382 | B1 | 2/2003 | Ullakko | |
| 6,592,689 | B2 | 7/2003 | Hays | |
| 6,623,566 | B1 * | 9/2003 | Senkov et al. | 148/121 |
| 6,652,679 | B1 | 11/2003 | Inoue | |
| 6,669,793 | B2 | 12/2003 | Hays | |
| 6,689,234 | B2 | 2/2004 | Branagan | |
| 6,692,590 | B2 | 2/2004 | Xing | |
| 6,709,536 | B1 | 3/2004 | Kim | |
| 6,763,593 | B2 * | 7/2004 | Nakatsu et al. | 30/346.54 |
| 6,949,312 | B1 * | 9/2005 | Kawakami et al. | 429/218.1 |
| 7,052,561 | B2 | 5/2006 | Lu | |
| 7,067,020 | B2 * | 6/2006 | Poon et al. | 148/403 |
| 7,186,306 | B2 * | 3/2007 | Branagan | 148/403 |
| 2003/0164209 | A1 | 9/2003 | Poon | |
| 2004/0154701 | A1 | 8/2004 | Lu | |
| 2004/0250929 | A1 * | 12/2004 | Branagan | 148/561 |
| 2005/0034792 | A1 | 2/2005 | Lu | |

FOREIGN PATENT DOCUMENTS

| | | | |
|---|---|---|---|
| JP | 53-057119 | A | 5/1978 |
| JP | 54-048637 | A | 4/1979 |
| JP | 07331396 | A | 12/1995 |
| JP | 09268354 | A | 10/1997 |
| JP | 11-186020 | A | 7/1999 |
| JP | 2000054089 | A | 2/2000 |
| JP | 2000073148 | A | 3/2000 |
| JP | 2000234461 | A | 8/2000 |
| WO | WO 98/22629 | | 5/1998 |

OTHER PUBLICATIONS

A. Inoue et al., "Synthesis and Properties of Ferromagnetic Bulk Amorphous Alloys", in Bulk Metallic Glasses, edited by W.L. Johnson et al., Materials Research Society Proceedings, 1999, p. 251-262, vol. 554, Warrendale, PA.

S. Pang et al., "New Fe-Cr-Mo-(Nb,Ta)-C-B Alloys with High Glass Forming Ability and Good Corrosion Resistance", Materials Transactions, 2001, p. 376, vol. 42, No. 2, The Japan Institute of Metals, Japan.

H. Fukumura et al., "(Fe, Co)-(Hf, Nb)-B Glassy Thick Sheet Alloys Prepared by a Melt Clamp Forging Method", Materials Transactions, 2001, p. 1820, vol. 42, No. 8, The Japan Institute of Metals, Japan.

T. Egami, "Universal Criterion for Metallic Glass Formation", Materials Science and Engineering A, 1997, p. 261-267, vol. 226-228, Elsevier Science S.A.

A. Inoue et al. "Formation and Functional Properties of Fe-Based Bulk Glassy Alloys", Materials Transactions, 2001, p. 970, vol. 42, No. 6, The Japan Institute of Metals, Japan.

V. Ponnambalam et al., "Synthesis of iron-based bulk metallic glasses as nonferromagnetic amorphous steel alloys", Applied Physics Letter, 2003, p. 1131-1133, vol. 83, No. 6, American Institute of Physics.

K. Hasimoto et al., "Extremely Corrosion-Resistant Bulk Amorphous Alloys", Materials Science Forum, 2001, p. 1-8, vol. 377, Trans Tech Publications, Switzerland.

O. Beckman et al., "Low Field Simultaneous AC and DC Magnetization Measurements of Amorphous (Fe0.20Ni0.80)75P16B6AI3 and (Fe0.68Mn0.32)75P16B6AI3", Physica. Scripta., 1982, p. 676-678, vol. 25.

V. Ponnambalam et al., "Fe-Based Bulk Metallic Glasses with Diameter Thickness Larger than One Centimeter", Journal of Materials Research, 2004, p. 1320-1323, vol. 19, No. 5, Materials Research Society.

P. Hess et al., "Indentation Fracture Toughness of Amorphous Steel", Journal of Materials Research, 2005, p. 783-786, vol. 20, No. 4, Materials Research Society.

V. Ponnambalam et al., "Fe-Mn-Cr-Mo-(Y,Ln)-C-B (Ln =Lanthanides) Bulk Metallic Glasses as Formable Amorphous Steel Alloys", Journal of Materials Research, 2004, p. 3046-3052, vol. 19, No. 10, Materials Research Society.

Z.P. Lu et al., "Structural Amorphous Steels", Physical Review Letters, 2004, p. 245503-1-245503-4, vol. 92, No. 24, The American Physical Society.

R.D. Conner et al., "Mechanical Properties of Zr57Nb5Al10Cu15.4Ni12.6 Metallic Glass Matrix Particulate Composites", Journal of Materials Research, 1999, p. 3292-3297, vol. 14, No. 8, Materials Research Society.

C.C. Hays et al., "Microstructure Controlled Shear Band Pattern Formation and Enhanced Plasticity of Bulk Metallic Glasses Containing in Situ Formed Ductile Phase Dendrite Dispersions", Physical Review Letters, 2000, p. 2901-2904, vol. 84, No. 13, The American Physical Socieety.

F. Szuecs et al., "Mechanical Properties of Zr56.2Ti13.8Nb5.06Cu6.9Ni5.6Be12.5 Ductile Phase Reinforced Bulk Metallic Glass Composite", Acta Materialia, 2001, p. 1507-1513, No. 49, Elsevier Science Ltd.

U. Kuhn et al., "ZrNbCuNiAl Bulk Metallic Glass Matrix Composites Containing Dendritic BCC Phase Precipitates", Applied Physics Letters, 2002, p. 2478-2480, vol. 80, No. 14, American Institute of Physics.

C. Fan et al., "Metallic Glass Matrix Composite with Precipitated Ductile Reinforcement", Applied Physics Letters, 2002, p. 1020-1022, vol. 81, No. 6, American Institute of Physics.

(56) References Cited

OTHER PUBLICATIONS

R.T. Ott et al., "Structure and Properties of Zr-Ta-Cu-Ni-Al Bulk Metallic Glasses and Metallic Glass Matrix Composites", Journal of Non-Crystalline Solids, 2003, p. 158-163, vol. 317, Elsevier Science B.V, L.Q. Xing et al., "Relation Between Short-Range Order and Crystallization Behavior in Zr-Based Amorphous Alloys", Applied Physics Letters, 2000, p. 1970-1972, vol. 77, No. 13, American Institute of Physics.

Y.K. Xu et al., "Ceramics Particulate Reinforced Mg65Cu20Zn5Y10 Bulk Metallic Glass Composites", Scripta Materialia, 2003, p. 843-848, No. 49, Elsevier Science Ltd.

H. Ma et al., "Mg-Based Bulk Metallic Glass Composites with Plasticity and High Strength", Applied Physics Letters, 2003, p. 2793-2795, vol. 83, No. 14, American Institute of Physics.

M. Widom et al., "Stability of Fe-Based Alloys with Structure Type C6Cr23", Journal of Materials Research, 2005, p. 237-242, vol. 20, No. 1, Materials Research Society.

S.V. Nair et al., "Toughening Behavior of a Two-Dimensional SiC/SiC Woven Composite At Ambient Temperature: I, Damage Initiation and R-Curve Behavior", Journal of the American Ceramic Society, 1998, p. 1149-1156, vol. 81, No. 5.

S. Pang et al., "New Fe-Cr-Mo-(Nb,Ta)-C-B Alloys with High Glass Forming Ability and Good Corrosion Resistance", Materials Transactions, 2001, p. 376-379, vol. 42, No. 2, The Japan Institute of Metals, Japan.

H. Fukumura et al., "(Fe, Co)-(Hf, Nb)-B Glassy Thick Sheet Alloys Prepared by a Melt Clamp Forging Method", Materials Transactions, 2001, p. 1820-1822, vol. 42, No. 8, The Japan Institute of Metals, Japan.

Inoue et al. "Formation and Functional Properties of Fe-Based Bulk Glassy Alloys", Materials Transactions, 2001, p. 970-978, vol. 42, No. 6, The Japan Institute of Metals, Japan.

* cited by examiner

NON-FERROMAGNETIC AMORPHOUS STEEL ALLOYS CONTAINING LARGE-ATOM METALS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCES TO RELATED APPLICATIONS

This application claims priority under 35 USC § 119(e) to U.S. Provisional Application Ser. Nos. 60/638,259, filed Dec. 22, 2004, and is a Continuation-in-part application of U.S. application Ser. No. 10/559,002, filed Nov. 30, 2005 now U.S. Pat. No. 7,517,415, entitled "Non-ferromagnetic Amorphous Steel Alloys Containing Large-Atom Metals," which is a national stage filing of International Application No. PCT/US2004/016442, filed on May 25, 2004, which claims priority under 35 USC § 119(e) to U.S. Provisional Application Ser. Nos. 60/475,185, filed Jun. 2, 2003, 60/513,612, filed Oct. 23, 2003 and 60/546,761, filed Feb. 23, 2004, all of the above-mentioned disclosures of which are hereby incorporated by reference herein in their entirety.

US GOVERNMENT RIGHTS

This invention was made with United States Government support under ONR Grant No. N00014-01-1-10961 awarded by the Defense Advance Research Projects Agency/Office of Naval Research. The United States Government has certain rights in the invention.

BACKGROUND OF THE INVENTION

Bulk-solidifying amorphous metal alloys (a.k.a. bulk metallic glasses) are those alloys that can form an amorphous phase upon cooling the melt at a rate of several hundred degrees Kelvin per second or lower. Most of the prior amorphous metal alloys based on iron (i.e., those that contain 50 atomic percent or higher iron content) are designed for magnetic applications. The Curie temperatures are typically in the range of about 200-300° C. Furthermore, these previously described amorphous iron alloys are obtained in the form of cylinder-shaped rods, usually three millimeters or smaller in diameter, as well as sheets less than one millimeter in thickness.

Recently, a class of bulk-solidifying iron-based amorphous metals have been described that exhibit suppressed magnetism, relative to conventional compositions, while still achieving acceptable processibility of the amorphous metal alloys and maintaining superior mechanical properties and good corrosion resistance properties. These alloys are described in U.S. patent application Ser. No. 10/364,123 and PCT Patent Application No. PCT/US03/04049, and both having a filing date of Feb. 11, 2003 (both of these disclosures of which are hereby incorporated by reference herein in their entirety). These previously described amorphous alloys, which are non-ferromagnetic at ambient temperature, are multicomponent systems that contain about 50 atomic percent iron as the major component. The remaining composition combines suitable mixtures of metalloids and other elements selected mainly from manganese, chromium, and refractory metals. In addition these amorphous alloys exhibited improved processibility relative to previously disclosed bulk-solidifying iron-based amorphous metals, and this improved processibility is attributed to the high reduced glass temperature Trg (e.g., 0.6 to 0.63) and large supercooled liquid region (ΔTx) (e.g., about 50-100° C.) of the alloys. However, the largest diameter size of amorphous cylinder samples that could be obtained using these alloys was approximately 4 millimeters.

There is a strong desire for bulk-solidifying iron-based amorphous alloys, which are non-ferromagnetic at ambient temperature and exhibit a higher degree of processibility than previously disclosed alloys. The present invention relates to amorphous steel alloys that comprise large atom inclusions to provide a non-ferromagnetic (at ambient temperature) bulk-solidifying iron-based amorphous alloys with enhanced glass formability. Large atoms are characterized by an atom size ratio of ~1.2 between the large atom and iron atom, and their inclusion in the alloy significantly improves the processibility of the resulting amorphous steel alloy, resulting in sample dimensions that reach 12 millimeters or larger (0.5 inch) in diameter thickness.

SUMMARY OF VARIOUS EMBODIMENTS OF THE INVENTION

One embodiment of the present invention is directed to novel non-ferromagnetic amorphous steel alloys represented by the general formula:

Fe—Mn—Cr—Mo—B-M-X—Z-Q wherein M represents one or more elements selected from the group consisting of Al, Ga, In, Sn, Si, Ge and Sb; X represents one or more elements selected from the group consisting of Ti, Zr, Hf, Nb, V, W and Ta; Z is an element selected from the group consisting of C or Ni; and Q represents one or more large-atom metals. Typically, the total amount of the Q constituent is 3 atomic percents or less. In one embodiment the non-ferromagnetic amorphous steel alloy is represented by the general formula: Fe—Mn—Cr—Mo-(Q)-C—(B) and in another embodiment the alloy is represented by the general formula: Fe—Mn—(Q)-B—(Si), wherein the elements in parentheses are minor components. In accordance with one embodiment the improved non-ferromagnetic amorphous steel alloys of the present invention are used to form articles of manufacture.

An aspect of an embodiment of the present invention provides an amorphous alloy represented by the formula:

$$Fe_{51}Mn_{10}Cr_4Mo_{14}C_{15}B_6$$

and wherein for a test duration the alloy is exposed to an environment having a designated pH level. The alloy is determined to have a differential voltage, V, wherein differential voltage, V, equals $E_{pit}-E_{oc}$, wherein $E_{pit}$ is pitting potential and $E_{oc}$ is open circuit potential, wherein:

the alloy has a voltage differential, V, that is determined to have at least one of the following magnitudes:

if the PH level is equal to about 1.0, then V is equal to about 0.202;

if the PH level is equal to about 6.5, then V is equal to about 0.782; and if the PH level is equal to about 11.0, then V is equal to about 1.263. Further, the test duration can be less than about 1 hour, about an hour or greater than an hour.

An additional aspect of an embodiment of the present invention provides an amorphous alloy represented by the formula:

$$Fe_{48}Cr_{15}Mo_{14}ER_2C_{15}B_6$$

and wherein for a test duration the alloy is exposed to an environment having a designated pH level. The alloy is determined to have a differential voltage, V, wherein differential voltage, V, equals $E_{pit}-E_{oc}$, wherein $E_{pit}$ is pitting potential and $E_{oc}$ is open circuit potential, wherein:

the alloy has a voltage differential, V, that is determined to have at least one of the following magnitudes:

if the PH level is equal to about 1.0, then V is equal to about 0.710 if the PH level is equal to about 6.5, then V is equal to about 0.883 and if the PH level is equal to about 11.0, then V is equal to about 1.129.

Further, the test duration can be less than about 1 hour, about an hour or greater than an hour.

Still yet, an aspect of an embodiment of the present invention provides an amorphous alloy represented by the formula:

$$Fe_{50}Cr_{15}Mo_{14}C_{15}B_6$$

and wherein for a test duration the alloy is exposed to an environment having a designated pH level. The alloy is determined to have a differential voltage, V, wherein differential voltage, V, equals $E_{pit}-E_{oc}$, wherein $E_{pit}$ is pitting potential and $E_{oc}$ is open circuit potential, wherein:

the alloy has a voltage differential, V, that is determined to have at least one of the following magnitudes:

if the PH level is equal to about 1.0, then V is equal to about 0.087;

if the PH level is equal to about 6.5, then V is equal to about 0.244; and if the PH level is equal to about 11.0, then V is equal to about 0.777.

Further, the test duration can be less than about 1 hour, about an hour or greater than an hour.

These and other aspects of the disclosed technology and systems, along with their advantages and features, will be made more apparent from the description, drawings and claims that follow.

BRIEF DESCRIPTION OF THE DRAWINGS

The accompanying drawings, which are incorporated into and form a part of the instant specification, illustrate several aspects and embodiments of the present invention and, together with the description herein, serve to explain the principles of the invention. The drawings are provided only for the purpose of illustrating select embodiments of the invention and are not to be construed as limiting the invention.

FIG. 2 illustrates a differential thermal analysis plot obtained at scanning rate of 10° C./min showing glass transition, crystallization, and melting in the present invention exemplary amorphous steel alloys of DARVA-Glass101.

DETAILED DESCRIPTION OF EMBODIMENTS

Definitions

Figure 1:
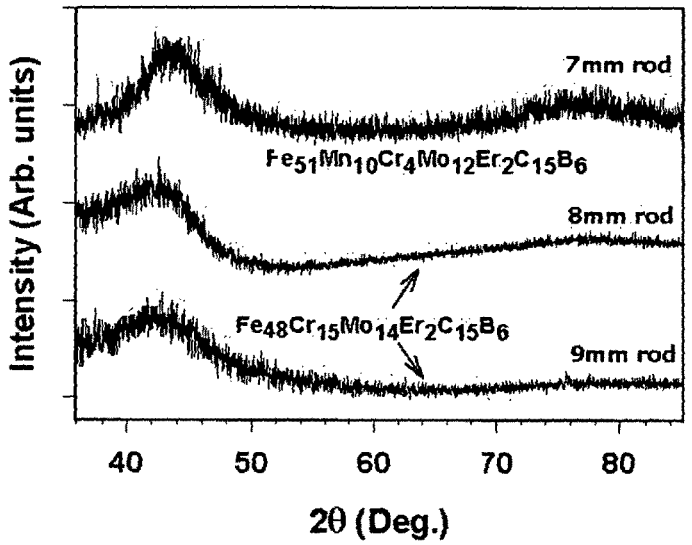
FIG. 1 illustrates an x-ray diffraction pattern from exemplary sample pieces (each of total mass about 1 gram) obtained by crushing as-cast rods of an amorphous steel alloy of the present invention (DARVA-Glass 101).

In describing and claiming the invention, the following terminology will be used in accordance with the definitions set forth below.

As used herein, the term "reduced glass temperature (Trg)" is defined as the glass transition temperature (Tg) divided by the liquidus temperature (Tl) in K.

As used herein, the term "supercooled liquid region ($\Delta Tx$)" is defined as crystallization temperature minus the glass transition temperature.

As used herein, the term "large atom metals" refers to elements having an atom size ratio of approximately 1.2 or greater relative to the iron atom. These include the elements Sc, Y, Ce, Pr, Nd, Pm, Sm, Eu, Gd, Tb, Dy, Ho, Er, Tm, Yb and Lu.

As used herein, the term "iron-based alloy" refers to alloys wherein iron constitutes a major component of the alloy. Typically, the iron-based amorphous alloys of the present invention have an Fe content of approximately 50%, however, the Fe content of the present alloys may comprise anywhere from 35% to 65% iron.

As used herein, the term "amorphous alloy" is intended to include both completely amorphous alloys (i.e. where there is no ordering of molecules), as well as partially crystalline alloys containing crystallites that range from nanometer to the micron scale in size.

Embodiments

The present invention relates to non-ferromagnetic (at ambient temperature) bulk-solidifying iron-based amorphous alloys that have been prepared using large atom inclusions to enhance the glass formability of the alloy. In one embodiment the improved non-ferromagnetic (at ambient temperature) bulk-solidifying iron-based amorphous alloys of the present invention are completely amorphous. Large atoms, as the term is used herein, are characterized as having an atom size ratio of approximately 1.3 or greater relative to iron. Inclusion of such large atoms, including ytrium and the lanthanide elements, in non-ferromagnetic iron-based amorphous alloys significantly improves the processibility of the resulting amorphous steel alloy. More particularly, in one embodiment, iron-based amorphous alloys, comprising at least 45% iron, are prepared using commercial grade material to create alloys that can be processed into cylinder samples having a diameter of 5 millimeters or greater. In one embodiment iron-based amorphous alloys, comprising at least 45% iron, are prepared using commercial grade material to create alloys that can be processed into cylinder samples having a diameter of 7 millimeters or greater.

The alloys of the present invention represent a new class of castable amorphous steel alloys for non-ferromagnetic structural applications, wherein the alloys exhibit enhanced processibility, (relative to previously disclosed bulk-solidifying iron-based amorphous alloys) magnetic transition temperatures below ambient temperatures, mechanical strengths and hardness superior to conventional steel alloys, and good corrosion resistance. Furthermore, since the synthesis-processing methods employed by the present invention do not involve any special materials handling procedures, they are directly adaptable to low-cost industrial processing technology.

Introduction of large atoms into amorphous steel alloys leads to the destabilization of crystal phase due to severe atomic level stress, resulting in the (relative) stabilization of the amorphous phase instead. Additionally, the large-atom and metalloid elements employed in the present invention alloys exhibit large negative heats of formation and these two groups of atoms associate strongly in the liquid state to form a reinforced structure that further stabilizes the glass. In accordance with one embodiment an iron-based amorphous alloy with enhanced glass formability properties is prepared comprising one or more large-atom elements selected from the group consisting of Sc, Y, Ce, Pr, Nd, Pm, Sm, Eu, Gd, Tb, Dy, Ho, Er, Tm, Yb and Lu. In one embodiment the large-atom element is selected from the group consisting of Y, Gd, Tb, Dy, Ho, Er, Tm, Yb and Lu.

Several classes of non-ferromagnetic ferrous-based bulk amorphous metal alloys have been previously described. For example, one previously described class of ferrous-based bulk amorphous metal alloys is a high manganese-high molybdenum class that contains manganese, molybdenum, and carbon as the principal alloying components. This class of Fe—Mn—Mo—Cr—C—(B) [element in parenthesis is the minority constituent] amorphous alloys is known as the DARPA Virginia-Glass1 (DARVA-Glass1). Another known class of ferrous-based bulk amorphous metal alloys is a high-manganese class that contains manganese and boron as the principal alloying components. This class of Fe—Mn—(Cr,Mo)—(Zr,Nb)—B alloys is known as the DARVA-Glass2. By incorporating phosphorus in DARVA-Glass1, the latter is modified to form Fe—Mn—Mo—Cr—C—(B)—P amorphous alloys known as DARVA-Glass102. These bulk-solidifying amorphous alloys can be obtained in various forms and shapes for various applications and utilizations. However, it is anticipated that the glass formability properties as well as other beneficial properties of such ferrous-based bulk amorphous metal alloys can be improved by the addition of large-atom elements in the alloy. More particularly, the improved iron based bulk-solidifying amorphous alloys of the present invention can be prepared from commercial grade material and processed into cylinder samples having a diameter of 3, 4, 5, 6 or 7 millimeters or even greater.

In accordance with one embodiment of the present invention, an iron-based amorphous alloy with enhanced glass formability properties is provided wherein the alloy is represented by the formula:

$$Fe_{(100-t)}Mn_nCr_mMo_pB_qM_dX_rZ_sQ_g \qquad \text{I}$$

wherein M represents one or more elements selected from the group consisting of Al, Ga, In, Sn, Si, Ge and Sb;

X represents one or more elements selected from the group consisting of Ti, Zr, Hf, Nb, V, W and Ta;

Z is an element selected from the group consisting of C, Co or Ni;

Q represents one or more large-atom metals wherein the sum of the atomic percentage of said large-atom metals is equal to g;

n, m, p, q, d, r, s and g are atomic percentages, wherein n is a number selected from 0 to about 29;

m and p are independently a number selected from 0 to about 16, wherein n+m is at least 10;

q is a number selected from about 6 to about 21;

r and d are independently selected from 0 to about 4;

s is a number selected from 0 to about 20;

g is a number greater than 0 but less than or equal to about 10; and t is the sum of n, m, p, q, r, s, d and g, with the proviso that t is a number selected from about 40 to about 60. In accordance with one embodiment, an alloy of the general formula I is provided wherein M is an element selected from the group consisting of Al, Ga, In, Sn, Si, Ge and Sb; X is an element selected from the group consisting of Ti, Zr, Hf, Nb, V, W and Ta; Z is an element selected from the group consisting of C, Co or Ni; and Q is an element selected from the group consisting of Sc, Y, Ce, Pr, Nd, Pm, Sm, Eu, Gd, Tb, Dy, Ho, Er, Tm, Yb and Lu. In accordance with another embodiment an alloy of the general formula I is provided wherein Fe content is at least about 45%, Z is carbon, s is about 13 to about 17, q is at least about 4, d and r are both 0, and the sum of m, p and g is less than about 20. In a further embodiment, an alloy of the general formula I is provided wherein Fe content is at least about 45%, Z is carbon and s is about 13 to about 17, q is at least about 4, d and r are both 0, the sum of m, p and g is less than about 20 and Q is an element selected from the group consisting of Sc, Y, Ce, Pr, Nd, Pm, Sm, Eu, Gd, Tb, Dy, Ho, Er, Tm, Yb and Lu.

In another embodiment the improved alloy of the present invention is represented by the formula:

$$Fe_{(100-t)}Mn_nCr_mMo_pB_qC_sQ_g \quad \text{II}$$

wherein Q is an element selected from the group consisting of Y, Ce, Pr, Nd, Pm, Sm, Eu, Gd, Tb, Dy, Ho, Er, Tm, Yb and Lu, n is a number selected from 0 to about 12, m is a number selected from 0 to about 16, wherein n+m is at least 10, p is a number selected from about 8 to about 16, s is at least about 13;

q is at least about 5;

g is a number greater than 0 but less than or equal to about 3; and t is the sum of n, m, p, q, s and g, with the proviso that the sum of p and g is less than about 16, and t is not greater than about 55. In one embodiment t is a number selected from about 38 to about 55 and Q is an element selected from the group consisting of Sc, Y, Gd, Tb, Dy, Ho, Er, Tm, Yb and Lu. In one embodiment an alloy of general formula II is prepared wherein t is a number selected from about 45 to about 55; Q is an element selected from the group consisting of Sc, Y, Gd, Tb, Dy, Ho, Er, Tm, Yb and Lu and the alloy further comprises 2% or less of other refractory metals (Ti, Zr, Hf, Nb, V, W and Ta) and 2% or less of "Group B" elements selected from the group consisting of Al, Ga, In, Sn, Si, Ge and Sb. In one embodiment an alloy of general formula II is prepared using commercial grade materials and can be processed into cylinder samples having a diameter of 5 millimeters or greater.

Moreover, in another embodiment, phosphorus is incorporated into the MnMoC-alloys to modify the metalloid content, with the goal of further enhancing the corrosion resistance. Various ranges of thickness are possible. For example, in one embodiment, bulk-solidified non-ferromagnetic amorphous samples of greater than about 3 mm or 4 mm in diameter can be obtained. The phosphorus containing alloys of the present invention are represented by the formula:

$$Fe_{(100-t)}Mn_nCr_mMo_pB_qC_sQ_gP_z$$

wherein Q is an element selected from the group consisting of Sc, Y, Ce, Pr, Nd, Pm, Sm, Eu, Gd, Tb, Dy, Ho, Er, Tm, Yb and Lu, n is a number selected from 0 to about 12, m is a number selected from 0 to about 16, wherein n+m is at least 10, p is a number selected from about 8 to about 16, s is at least about 13;

q is at least about 5;

g is a number greater than 0 but less than or equal to about 3;

z is a number selected from about 5 to about 12; and t is the sum of n, m, p, q, s, g and z, with the proviso that the sum of p and g is less than 16, and t is not greater than 55. In one embodiment t is a number selected from about 38 to about 55 and Q is an element selected from the group consisting of Sc, Y, Gd, Tb, Dy, Ho, Er, Tm, Yb and Lu.

In one embodiment the alloy is represented by the formula:

$$Fe_{(100-t)}Mn_nCr_mMo_pB_qC_sQ_g$$

wherein Q is an element selected from the group consisting of Sc, Y, Ce, Pr, Nd, Pm, Sm, Eu, Gd, Tb, Dy, Ho, Er, Tm, Yb and Lu;

n is a number selected from about 7 to about 12;

m is a number selected from about 4 to about 6;

p is a number selected from about 8 to about 15, g is a number selected from about 1 to about 3, and p+g equals a number selected from about 11 to about 15;

s+q equals at least 18; and t is a number ranging from about 47 to about 53. In one embodiment, Q is an element selected from the group consisting of Sc, Y, Ce, Sm, Gd, Tb, Dy, Ho, Er, Tm, Yb and Lu. In another embodiment, the alloy is represented by the formula:

$$Fe_{(100-t)}Mn_nCr_mMo_pB_qC_sQ_g$$

wherein Q is an element selected from the group consisting of Sc, Y, Gd, Tb, Dy, Ho, Er, Tm, Yb and Lu;

n is a number selected from 0 to about 10;

m is a number selected from about 4 to about 16;

p is a number selected from about 8 to about 12, g is a number selected from about 2 to about 3, and p+g equals a number selected from about 11 to about 14;

s is a number selected from about 14 to about 16;

q is a number selected from about 5 to about 7; and t is the sum of n, m, p, q, s and g, and is a number selected from about 46 to about 54. 6 mm-diameter or larger amorphous rods are obtained in the compositional domain using this alloy. Furthermore, 7 mm-diameter or larger amorphous rods are obtained in the compositional domain using an alloy represented by the formula $$Fe_{(100-t)}Mn_nCr_mMo_pB_qC_sQ_g$$

wherein Q is an element selected from the group consisting of Sc, Y, Gd, Tb, Dy, Ho, Er, Tm, Yb and Lu;

n is a number selected from 0 to about 2;

m is a number selected from about 11 to about 16;

p is a number selected from about 8 to about 12, g is a number selected from about 2 to about 3, and p+g equals a number selected from about 11 to about 14;

s is a number selected from about 14 to about 16;

q is a number selected from about 5 to about 7; and t is the sum of n, m, p, q, s and g, and is a number selected from about 47 to about 53. In one embodiment an alloy of formula II is provided wherein Q is Y or Gd; n is about 5 to about 10; m is a number selected from about 4 to about 6; g is a number selected from about 2 to about 3, and p+g equals a number selected from about 14 to about 15; s is a number selected from about 15 to about 16; q is about 6; and t is a number selected from about 47 to about 51. In a further embodiment, Q is Y or Gd; n is about 10; m is about 4; g is about 2; p+g equals about 14; s is a number selected from about 15 to about 16; q is about 6; and t is a number selected from about 47 to about 51. In one embodiment an alloy of formula II is provided wherein Q is an element selected from the group consisting of Sc, Y, Gd, Tb, Dy, Ho, Er, Tm, Yb and Lu; n is about 5 to about 10; m is a number selected from about 4 to about 6; g is a number selected from about 2 to about 3, and p+g equals a number selected from about 14 to about 15; s is a number selected from about 15 to about 16; q is about 6; and t is a number selected from about 47 to about 51.

In another embodiment of the present invention the alloy is represented by the formula:

$$Fe_{(100-t)}Cr_mMo_pB_qC_sQ_g \quad \text{III}$$

wherein Q is an element selected from the group consisting of Sc, Y, Gd, Tb, Dy, Ho, Er, Tm, Yb and Lu;

m is a number selected from about 10 to about 20;

p is a number selected from about 5 to about 20;

q is a number selected from about 5 to about 7;

s is a number selected from about 15 to about 16;

g is a number selected from about 1 to about 3; and t is the sum of m, p, q, s and g, and is a number selected from about 47 to about 55. In one embodiment an alloy of general formula III is prepared wherein m is a number selected from about 12 to about 16; p is a number selected from about 10 to about 16; q is a number selected from about 5 to about 7; s is a number selected from about 15 to about 16; g is a number selected from about 2 to about 3; and t is a number selected from about 47 to about 55.

In accordance with one embodiment the improved alloy of the present invention comprises an alloy represented by the formula:

$$Fe_{(100-t)}Mn_nCr_mB_qSi_dX_rQ_gNi_s \quad \text{IV}$$

wherein X is an element selected from the group consisting of Mo, Ta or Nb;

Q is an element selected from the group consisting of Sc, Y, Ce, Pr, Nd, Pm, Sm, Eu, Gd, Tb, Dy, Ho, Er, Tm, Yb and Lu;

n is a number selected from about 10 to about 29;

m is a number selected from 0 to about 4, wherein n+m is at least 15 but less than 30;

d and r are numbers independently selected from 0 to about 4;

q is a number selected from about 17 to about 21, wherein d+q is less than or equal to 23;

g is a number selected from about 4 to about 8;

s is a number ranging from 0 to about 20; and t is the sum of n, m, q, r, d, s and g, with the proviso that t is a number ranging from about 35 to about 55. In a further embodiment an alloy of general formula IV is prepared wherein Q is an element selected from the group consisting of Sc, Y, Gd, Tb, Dy, Ho, Er, Tm, Yb and Lu, n is a number selected from about 15 to about 29; m is 0, q is a number selected from about 17 to about 21; d is a number ranging from about 1 to about 2; r is a number selected from about 2 to about 3; s is a number ranging from 0 to about 20; g is a number selected from about 4 to about 8; and t is a number selected from about 45 to about 55. In a further embodiment an alloy of general formula IV is prepared wherein Q is an element selected from the group consisting of Y, Gd, Tb, Dy, Ho, Er, Tm, Yb and Lu, n is a number selected from about 15 to about 29; m and r are both 0, q is a number selected from about 17 to about 21; d is a number ranging from about 1 to about 2; s is a number ranging from 0 to about 20; g is a number selected from about 4 to about 8; and t is a number selected from about 45 to about 55. In a further embodiment an alloy of general formula IV is prepared wherein Q is an element selected from the group consisting of Sc, Y, Gd, Tb, Dy, Ho, Er, Tm, Yb and Lu, n is a number selected from about 15 to about 29; m, d and r are each 0, q is a number selected from about 17 to about 21; s is a number ranging from 0 to about 20; g is a number selected from about 4 to about 8; and t is a number selected from about 45 to about 55.

In another embodiment of the present invention, the improved alloy has the general formula $$Fe_{(100-t)}Mn_nX_rB_qQ_g$$

wherein X is an element selected from the group consisting of Mo, Ta or Nb; Q is an element selected from the group consisting of Sc, Y, Gd, Tb, Dy, Ho, Er, Tm, Yb and Lu, n is a number selected from about 15 to about 29; r is a number selected from about 2 to about 3; q is a number selected from about 17 to about 21; g is a number selected from about 4 to about 8; and t is the sum of n, r, q and g, and is a number selected from about 45 to about 55.

In another embodiment the improved alloy of the present invention comprises an alloy represented by the formula:

$$Fe_{(100-t)}Mn_nCr_mB_qSi_dMo_{r1}Nb_{r2}Ta_{r3}Ni_sQ_g \quad \text{V}$$

wherein Q is an element selected from the group consisting of Sc, Y, Ce, Pr, Nd, Pm, Sm, Eu, Gd, Tb, Dy, Ho, Er, Tm, Yb and Lu;

n is a number ranging from 15 to about 29;

m is a number ranging from 0 to about 4, wherein n+m is at least 15;

q is a number ranging from about 17 to about 21;

r1, r2 and r3 are independently selected from 0 to about 4;

d is a number ranging from 0 to about 4;

s is a number ranging from 0 to about 20;

g is a number ranging from about 4 to about 8; and t is the sum of n, m, q, r1, r2, r3, d, s and g, with the proviso that t is a number ranging from about 40 to about 65. In a further embodiment an alloy of general formula V is prepared wherein Q is an element selected from the group consisting of Sc, Y, Gd, Tb, Dy, Ho, Er, Tm, Yb and Lu, n is a number ranging from 15 to about 29, m is a number ranging from 0 to about 4, wherein n+m is at least 15, q is a number ranging from about 17 to about 21, r1, r2 and r3 are independently selected from 0 to about 4, d is a number ranging from 0 to about 4, s is 0, g is a number ranging from about 4 to about 8, and t is a number ranging from about 45 to about 55.

Similar to previously disclosed amorphous steel alloys, the addition of about 10 atomic percent or higher manganese and chromium significantly suppresses the ferromagnetism. Only spin-glass-like magnetic transitions at 20-30 K are observed in magnetization measurements performed at 100 Oe applied field. Compositions of the present invention reveal that DARVA-Glass101 (i.e. DARVA-Glass1 alloys modified to include large-atom metals), which contain significantly higher molybdenum content than conventional steel alloys, exhibit much of the superior mechanical strengths and good corrosion resistance similar to DARVA-Glass1.

Preliminary measurements in one embodiment of the present invention show microhardness in the range of about 1200-1300 DPN and 1000-1100 DPN for Fe—Mn—Cr—Mo—(Y,Ln)-C—B and Fe—Mn—Y—Nb—B alloys, respectively. Based on these microhardness values, tensile fracture strengths of 3-4 GPa are estimated. The latter values are much higher than those reported for high-strength steel alloys. Also similar to previous amorphous steel alloys, the present invention is expected to exhibit elastic moduli comparable to super-austenitic steels, and good corrosion resistance properties comparable to those observed in amorphous iron- and nickel-based alloys. Preliminary measurements of elastic constants place the Young's moduli at ~180-210 GPa and bulk modulus at ~140-180 GPa for DARVA-Glass101, and corresponding moduli of ~190 GPa and ~140 GPa for DARVA-Glass201 (i.e. DARVA-Glass2 alloys modified to include large-atom metals).

Although improved glass formability is generally seen in adding yittrium (Y) or lanthanides (Ln) to Glass1, the largest improvements are found when Y or Ln elements from the latter half of the lanthanide series are selected. One class of improved iron-based amorphous alloys is a modified DARVA-Glass1 known as DARVA-Glass101 [Fe—Mn—Cr—Mo—(Y,Ln)-C—(B) type] alloys, where the Y or Ln content is preferably 3 atomic percents or less. As-cast amorphous rods of up to 12 mm or larger can be obtained in DARVA-Glass101. Another other class iron-based amorphous alloys is a modified DARVA-Glass2 known as DARVA-Glass201 [Fe—Mn—(Y,Ln)-B—(Si) type] alloys, where the preferred combined Y or Ln and Nb or Mo contents are less than 10 atomic percents. Casted amorphous rods of up to 4 mm can be obtained in DARVA-Glass201.

Owing to the high glass formability and wide supercooled liquid region, the amorphous alloys of the present invention can be prepared as various forms of amorphous alloy products, such as thin ribbon samples by melt spinning, amorphous powders by atomization, consolidated products, amorphous rods, thick layers by any type of advanced spray forming or scanning-beam forming, plastic forming, plastic forming, compaction, and sheets or plates by casting. Besides conventional injection casting, casting methods such as die casting, squeeze casting, and strip casting as well as other state-of the-art casting techniques currently employed in research labs and industries can also be utilized. Additionally, other "weaker" elements such as Al, Ga, In, Sn, Si, Ge, Sb, etc. which do not exhibit large negative heats of mixing with Fe, Cr, and Mo can be introduced to enhance the fluidity and therefore the processibility of the cast products. Furthermore, one can exploit the highly deformable behavior of the alloys in the supercooled liquid region to form desired shapes of amorphous or amorphous-composite products.

The present alloys may be devitrified to form amorphous-crystalline microstructures, or infiltrated with other ductile phases during solidification or melting of the amorphous alloys in the supercooled-liquid region, to form composite materials, which can result in strong hard products with improved ductility for structural applications. In accordance with one embodiment of the invention, the alloys can be made to exhibit the formation of microcrystalline γ-Fe upon cooling at a rate somewhat slower than the critical cooling rate for glass formation. In this case, the alloy can solidify into a composite structure consisting of ductile microcrystalline γ-Fe precipitates embedded in an amorphous matrix. In this way, high strength bulk microcrystalline γ-Fe composites materials can be produced and thus the range of practical applications is extended. In accordance with one embodiment, the volume fraction and size of the γ-Fe precipitates are influenced by the cooling rate and the amount of Ti and Ta in the alloy. For any given alloy composition, both the volume fraction and size of the quasi-crystalline precipitates increase with decreasing cooling rates.

In accordance with one embodiment of the present invention, an article of manufacture is provided wherein the article comprises an iron-based amorphous alloy represented by the formula:

$$Fe_{(100-t)}Mn_nCr_mMo_pB_qM_dX_rZ_sQ_g \quad \text{I}$$

wherein M represents one or more elements selected from the group consisting of Al, Ga, In, Sn, Si, Ge and Sb;

X represents one or more elements selected from the group consisting of Ti, Zr, Hf, Nb, V, W and Ta;

Z is an element selected from the group consisting of C Co or Ni;

Q represents one or more large-atom metals wherein the sum of the atomic percentage of said large-atom metals is equal to g;

n, m, p, q, d, r, s and g are atomic percentages, wherein n is a number selected from 0 to 29;

m and p are independently a number selected from 0 to 16, wherein n+m is at least 10;

q is a number selected from 4 to 21;

r and d are independently selected from 0 to 4;

s is a number selected from 0 to 20;

g is a number greater than 0 but less than or equal to 10; and t is the sum of n, m, p, q, r, s, d and g, with the proviso that t is a number selected from 40 to 60. In accordance with one embodiment, the article of manufacture comprises an alloy of the general formula I wherein M is an element selected from the group consisting of Al, Ga, In, Sn, Si, Ge and Sb; X is an element selected from the group consisting of Ti, Zr, Hf, Nb, V, W and Ta; Z is an element selected from the group consisting of C, Co or Ni; and Q is an element selected from the group consisting of Sc, Y, Ce, Pr, Nd, Pm, Sm, Eu, Gd, Tb, Dy, Ho, Er, Tm, Yb and Lu. In accordance with another embodiment, the article of manufacture comprises an alloy of the general formula I wherein Fe content is at least about 45%, Z is carbon, s is a number selected from 13 to 17, q is a number selected from 4 to 7, d and r are both 0, and the sum of m, p and g is less than 20. In a further embodiment, the article of manufacture comprises an alloy of the general formula I wherein Fe content is at least about 45% to about 55%, Z is carbon, Q is an element selected from the group consisting of Sc, Y, Gd, Tb, Dy, Ho, Er, Tm, Yb and Lu, n is a number selected from 0 to about 15, m is a number selected from 0 to about 16, wherein n+m is at least 15 but less than 30, p is a number selected from about 8 to about 16, s is about 13 to about 17, q is at least about 4 to about 7, d and r are both 0, g is a number selected from about 2 to about 3, and t is a number selected from about 46 to about 54.

In accordance with another embodiment, an article of manufacture is provided wherein the article comprises an iron-based amorphous alloy represented by the formula:

$$Fe_{(100-t)}Mn_nX_rB_qQ_g$$

wherein X is an element selected from the group consisting of Mo, Ta or Nb; Q is an element selected from the group consisting of Sc, Y, Gd, Tb, Dy, Ho, Er, Tm, Yb and Lu, n is a number selected from about 15 to about 29; r is a number selected from 2 to 3; q is a number selected from 17 to 21; g is a number selected from 4 to 8; and t is the sum of n, r, q and g, and is a number selected from 45 to 55.

The novel alloys of the present invention provide non-ferromagnetic properties at ambient temperature as well as useful mechanical attributes. For example, the present invention alloys exhibit magnetic transition temperatures below ambient, mechanical strengths and hardness superior to conventional steel alloys, and good corrosion resistance. Further advantages of the present alloys include specific strengths as high as, for example, 0.5 MPa/(Kg/m3) (or greater), which are the highest among bulk metallic glasses. Additionally the present alloys possess thermal stabilities that are the highest among bulk metallic glasses. The present alloys also have reduced chromium content compared to current candidate Naval steels, for example and can be prepared at significantly lower cost (for example, lower priced goods and manufacturing costs) compared with current refractory bulk metallic glasses.

Accordingly, the amorphous steel alloys of the present invention outperform current steel alloys in many application areas. Some products and services of which the present invention can be implemented include, but are not limited to 1) ship, submarine (e.g., watercrafts), and vehicle (land-craft and aircraft) frames and parts, 2) building structures, 3) armor penetrators, armor penetrating projectiles or kinetic energy projectiles, 4) protection armors, armor composites, or laminate armor, 5) engineering, construction, and medical materials and tools and devices, 6) corrosion and wear-resistant coatings, 7) cell phone and personal digital assistant (PDA) casings, housings and components, 8) electronics and computer casings, housings, and components, 9) magnetic levitation rails and propulsion system, 10) cable armor, 11) hybrid hull of ships, wherein "metallic" portions of the hull could be replaced with steel having a hardened non-magnetic coating according to the present invention, 12) composite power shaft, 13) actuators and other utilization that require the combination of specific properties realizable by the present invention amorphous steel alloys.

EXAMPLES

Practice of various embodiments will be still more fully understood from the following examples, which are presented herein for illustration only and should not be construed as limiting the invention in any way.

Example 1

Ingot Preparation

Alloy ingots are prepared by melting mixtures of commercial grade elements (e.g. iron is at most 99.9% pure) in an arc furnace or induction furnace. In order to produce homogeneous ingots of the complex alloys that contained manganese, refractory metals, and metals of large-atom elements such as yittrium and the lanthanides, as well as the metalloids particularly carbon, it was found to be advantageous to perform the alloying in two or more separate stages. For alloys that contain iron, manganese, and boron as the principal components, a mixture of all the elements except manganese was first melted together in an arc furnace. The ingot obtained was then combined with manganese and melted together to form the final ingot. For stage 2 alloying, it was found preferable to use clean manganese obtained by pre-melting manganese pieces in an arc furnace.

In the case of alloys that contain iron, manganese, molybdenum, and carbon as the principal components, iron granules, graphite powders (about −200 mesh), molybdenum powders (about −200 to −375 mesh), and the large-atom elements plus chromium, boron, and phosphorous pieces were mixed well together and pressed into a disk or cylinder or any given mass. Alternatively, small graphite pieces in the place of graphite powders can also be used. The mass is melted in an arc furnace or induction furnace to form an ingot. The ingot obtained was then combined with manganese and melted together to form the final ingot.

Ingots with further enhanced homogeneity can be achieved by forming Mn—(Y or Lanthanide element) and FeB precursor ingots that were then used in place of Mn and B. In another embodiment, boron is alloyed with iron to form near-stochiometric FeB compound. The remaining Fe is then alloyed with Mo, Cr, C, and Sc, Y/Lanthanide element as well as the FeB precursor to form Fe—Mo—Cr—(Y/Ln)-C—B. If needed, additional elements such as other refractory metals (Ti, Zr, Hf, Nb, V, Ta, W), Group B elements (Al, Ga, In, Sn, Si, Ge, Sb), Ni, and Co can also be alloyed in at this stage. Should the alloy contain Mn, a final alloying step is carried out to incorporate Mn in the final product.

Glass Formability and Processibility

Regarding the glass formability and processibility, bulk-solidifying samples can be obtained using a conventional copper mold casting, for example, or other suitable methods. In one instance, bulk solidification is achieved by injecting the melt into a cylinder-shaped cavity inside a copper block. Alternatively, suction casting can be employed to obtain bulk-solidifying amorphous samples similar in size to the injection-cast samples. The prepared samples were sectioned and metallographically examined, using an optical microscope to explore the homogeneity across the fractured surface. X-ray (CuKα) diffraction was performed to examine the amorphicity of the inner parts of the samples. Thermal transformation data were acquired using a Differential Thermal Analyzer (DTA). The designed ferrous-based alloys were found to exhibit a reduced glass temperature Trg in the range of ~0.58-0.60 and supercooled liquid region ΔTx in the range of ~30-50° C.

In the instant exemplary embodiment, the present invention amorphous steel alloys were cast into cylinder-shaped amorphous rods with diameters reaching 12 mm, or larger. Various ranges of thickness, size, length, and volume are possible. For example, in some embodiments the present invention alloys are processable into bulk amorphous samples with a range thickness of about 0.1 mm or greater. The amorphous nature of the rods is confirmed by x-ray and electron diffraction as well as thermal analysis (FIGS. 1 to 3 and 5 show some of the results).

Example 2

Preparation of DARVA-Glass101 and DARVA-Glass201 Amorphous Steel Alloys

Two classes of the non-ferromagnetic ferrous-based bulk amorphous metal alloys of the present invention have been prepared. The alloys in the subject two classes contain about 50 atomic % of iron and are obtained by alloying two types of alloys with large-atom elements. The first type (MnCr-MoQC-amorphous steel alloy or DARVA-Glass101) contains manganese, molybdenum, and carbon as the principal alloying components, wherein Q symbolizes the large-atom elements. The second type (MnQB-amorphous steel alloy or DARVA-Glass201) contains manganese and boron as the principal alloying components, wherein Q symbolizes the large-atom elements. For illustration purposes, more than sixty compositions of each of the two classes are selected for characterizing glass formability.

First, regarding the DARVA-Glass101 MnCrMoLgC-amorphous steel alloys, these alloys are given by the formula (in atomic percent) as follows:

$$Fe_{100-a-b-c-d-e}Mn_aCr_bMo_cQ_d(C,B)_e$$

wherein Q=Y and Lanthanide elements, and 12≥a≥0, 16≥b≥0, 16≥c≥8, 3≥d≥0, e≥18, and under the following constraints that the sum of c and d is less than 16, Fe content is at least about 45, C content is at least about 13%, and B content is at least about 5% in the overall alloy composition.

These alloys are found to exhibit a glass temperature Tg of 530-550° C. (or greater), $T_{rg}$ of 0.58-0.60 (or greater) and supercooled liquid region $\Delta T_x$ of 30-50° C. (or greater).

Figure 2A:
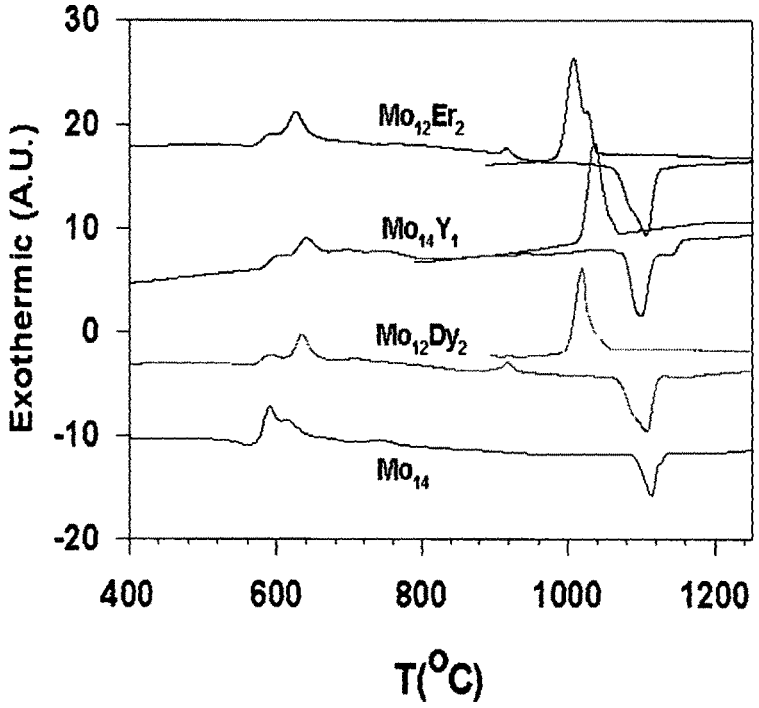
FIG. 2A represents the plot for the composition $Fe_{65-x-y}Mn_{10}Cr_4Mo_xQ_yC_{15}B_6$.
Figure 2B:
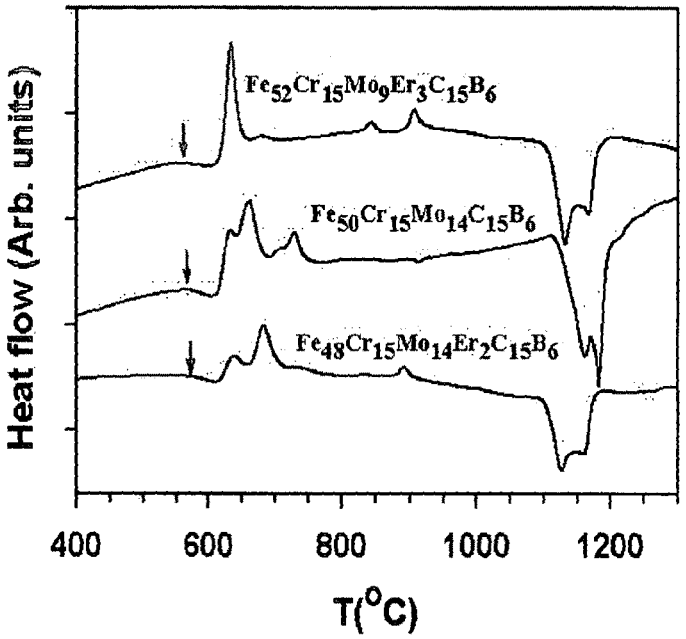
FIG. 2B represents the plot for the composition $Fe_{64-x-y}Cr_{15}Mo_xQ_yC_{15}B_6$, wherein Q is Y or a lanthanide element.
Figure 3A:
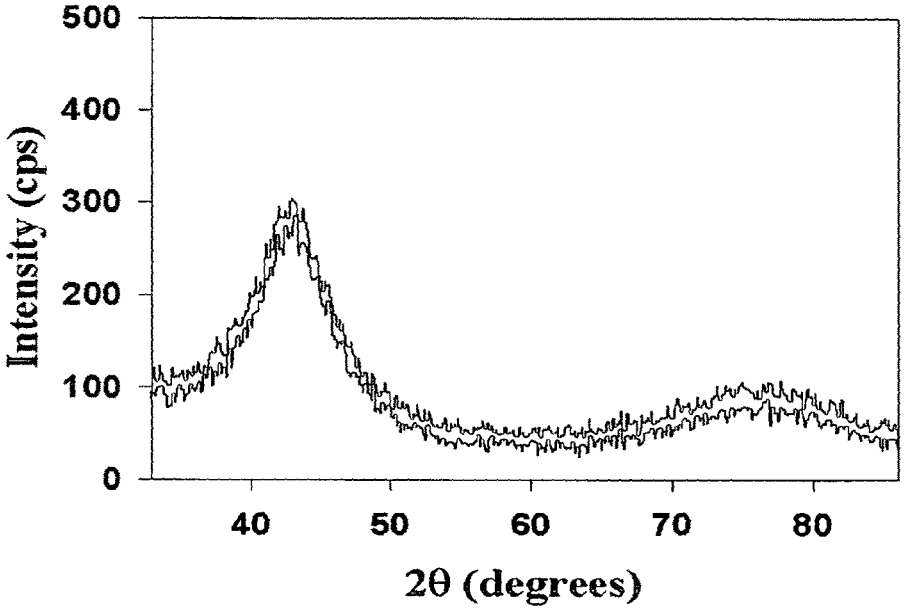
FIG. 3A illustrates an x-ray diffraction pattern for $Fe_{48}Cr_{15}Mo_{14}Er_2C_{15}B_6$ obtained by using crushed pieces (mass ~1 gram) from an injection-cast 10 mm-diameter rod.
Figure 3B:
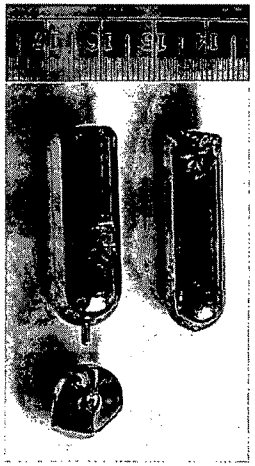
FIG. 3B represents a camera photo of a 10 mm-(top) and 12 mm-diameter (bottom) glassy rods as well as the sectioned surface of a small segment fractured from a 12 mm-diameter glassy rod.

DTA scans obtained for typical samples are shown in FIGS. 2A and 2B. These alloys can be processed into shapes over a selected range of thickness. For example, in some embodiments the present invention alloys are processible into bulk amorphous samples with a range thickness of at least 0.1 mm or greater. Meanwhile the compositional range expressed in the above formula can yield sample thickness of at least 1 mm or greater. In an embodiment, the MnCrMoLgC-alloys can be readily cast into about 12 mm-diameter or larger rods. A camera photo of injection-cast amorphous rods is displayed in FIG. 3.

Alloys that contain Y and the heavier Ln (from Gd to Lu), which can form glassy samples with diameter thicknesses of 6-12 mm or larger, are found to exhibit significantly higher glass formability than those containing the lighter Ln (i.e. from Ce to Eu). For example, the Mn-rich Glass101 alloys can only form 2 to 3 mm-diameter glassy rods and the Cr-rich Glass101 can only form 2 to 6 mm-diameter glassy rods when they are alloyed with the lighter Ln. For the Y and heavier Ln bearing alloys, a maximum diameter thickness of up to 7-10 mm can still be attained if 2 at. % or less of other refractory metals (Ti, Zr, Hf, Nb, V, Ta, W) and Group B elements (Al, Ga, In, Sn, Si, Ge, Sb) are also added. As mentioned above, some of the latter additions are introduced to enhance the processibility of the present amorphous steel alloys.

Because of the moderately high viscosity, the melt must be heated to ~150° C. above $T_l$ in order to provide the fluidity needed in copper mode casting. As a result, the effectiveness in heat removal is compromised, which could limit the diameter of the amorphous rods in this embodiment. Upon additional alloying, thicker samples could also be achieved. The full potential of these alloys as processible amorphous steel alloys can be further exploited by employing more advanced casting techniques such as high-pressure squeeze casting. Continuous casting methods can also be utilized to produce sheets and strips. A variety of embodiments representing a number of typical amorphous steel alloys of the MnCrMoLgC class with C content of 15% and B content of 6% together with the typical diameter of the bulk-solidifying amorphous cylinder-shaped samples obtained and transformation temperatures are listed in Table 1. At present, it is found in one embodiment that alloys containing as low as about 19% combined (C, B) metalloid content can be bulk solidified into about 6 mm-diameter amorphous rods. These exemplary embodiments are set forth for the purpose of illustration only and are not intended in any way to limit the practice of the invention.

TABLE 1

Thermal data obtained from differential thermal analysis (DTA) scans of typical DARVA-Glass101 MnCrMoLgC-type amorphous steel alloys.
Listed in the right-hand column are amorphous rod diameter size, liquidus onset tempertature $T_l^{onset}$, and peak temperature $T_l^{peak}$ (or final peak temperature $T_l^{peak/f}$ for non-eutectic melting) in the liquids region. The size of the supercooled liquid region is about 30-50° C., and $T_{rg}$ is 0.58-0.60. Results from DARVA-Glass1 that do not contain the large-atom metals are included for comparison.

| | |
|---|---|
| $Fe_{51}Mn_{10}Mo_{14}Cr_4C_{15}B_6$ | 4 mm; $T_g$ = 540° C.; $T_l^{onset}$ = 1080° C.; $T_l^{peak}$ = 1115° C. |
| $Fe_{50}Mn_{10}Cr_4Mo_{14}Y_1C_{15}B_6$ 3 | 4 mm; $T_g$ = 550° C.; $T_l^{onset}$ = 1080° C.; $T_l^{peak}$ = 1110° C. |
| $Fe_{51}Mn_{10}Cr_4Mo_{12}Y_2C_{15}B_6$ | 7 mm; $T_g$ = 530° C.; $T_l^{onset}$ = 1070° C.; $T_l^{peak}$ = 1090° C. |
| $Fe_{52}Mn_{10}Cr_4Mo_{12}Yb_1C_{15}B_6$ | 4 mm; $T_g$ = 540° C.; $T_l^{onset}$ = 1085° C.; $T_l^{peak}$ = 1110° C. |
| $Fe_{53}Mn_{10}Cr_4Mo_{10}Yb_2C_{15}B_6$ | 6 mm; $T_g$ = 540° C.; $T_l^{onset}$ = 1085° C.; $T_l^{peak}$ = 1110° C. |

TABLE 1-continued

Thermal data obtained from differential thermal analysis (DTA) scans of typical DARVA-Glass101 MnCrMoLgC-type amorphous steel alloys.
Listed in the right-hand column are amorphous rod diameter size, liquidus onset tempertature $T_l^{onset}$, and peak temperature $T_l^{peak}$ (or final peak temperature $T_l^{peak/f}$ for non-eutectic melting) in the liquids region. The size of the supercooled liquid region is about 30-50° C., and $T_{rg}$ is 0.58-0.60. Results from DARVA-Glass1 that do not contain the large-atom metals are included for comparison.

| | |
|---|---|
| $Fe_{49}Mn_{10}Cr_8Mo_{10}Yb_2C_{15}B_6$ | 6 mm; $T_g$ = 550° C.; $T_l^{onset}$ = 1090° C.; $T_l^{peak}$ = 1130° C. |
| $Fe_{51}Mn_{10}Cr_{10}Mo_{10}Yb_2C_{15}B_6$ | 6 mm; $T_g$ = 558° C.; $T_l^{onset}$ = 1090° C.; $T_l^{peak}$ = 1120° C. |
| $Fe_{54}Mn_{10}Cr_4Mo_8Yb_3C_{15}B_6$ | 4 mm; $T_g$ = 523° C.; $T_l^{onset}$ = 1085° C.; $T_l^{peak}$ = 1115° C. |
| $Fe_{49}Mn_{10}Cr_4Mo_{14}Yb_2C_{15}B_6$ | 4 mm; $T_g$ = 540° C.; $T_l^{onset}$ = 1078° C.; $T_l^{peak}$ = 1100° C. |
| $Fe_{53}Mn_{10}Mo_{14}Yb_2C_{15}B_6$ | 4 mm; $T_g$ = 540° C.; $T_l^{onset}$ = 1060° C.; $T_l^{peak}$ = 1085° C. |
| $Fe_{49}Mn_{10}Cr_8Mo_{10}Yb_2C_{15}B_6$ | 5 mm; $T_g$ = 550° C.; $T_l^{onset}$ = 1090° C.; $T_l^{peak}$ = 1130° C. |
| $Fe_{50}Mn_7Cr_{10}Mo_{10}Yb_2C_{15}B_6$ | 5 mm; $T_g$ = 558° C.; $T_l^{onset}$ = 1090° C.; $T_l^{peak}$ = 1120° C. |
| $Fe_{50}Mn_{10}Cr_4Mo_{12}Yb_3C_{15}B_6$ | 6 mm; $T_g$ = 530° C.; $T_l^{onset}$ = 1070° C.; $T_l^{peak}$ = 1110° C. |
| $Fe_{53}Mn_{10}Cr_4Mo_{10}Gd_2C_{15}B_6$ | 5 mm; $T_g$ is not clear; $T_l^{onset}$ = 1080° C.; $T_l^{peak}$ = 1100° C. |
| $Fe_{51}Mn_{10}Cr_4Mo_{12}Gd_2C_{15}B_6$ | 6 mm; $T_g$ is not clear; $T_l^{onset}$ = 1080° C.; $T_l^{peak}$ = 1100° C. |
| $Fe_{51}Mn_{10}Cr_4Mo_{12}Dy_2C_{15}B_6$ | 7 mm; $T_g$ = 530° C.; $T_l^{onset}$ = 1065° C.; $T_l^{peak}$ = 1110° C. |
| $Fe_{51}Mn_{10}Cr_4Mo_{12}Er_2C_{15}B_6$ | 7 mm; $T_g$ = 540° C.; $T_l^{onset}$ = 1070° C.; $T_l^{peak}$ = 1110° C. |
| $Fe_{50}Mn_9Cr_4Mo_{14}Er_2C_{15}B_6$ | 6 mm; $T_g$ = 535° C.; $T_l^{onset}$ = 1070° C.; $T_l^{peak}$ = 1095° C. |
| $Fe_{50}Mn_{10}Cr_4Mo_{12}Er_3C_{15}B_6$ | 6 mm; $T_g$ = 530° C.; $T_l^{onset}$ = 1075° C.; $T_l^{peak}$ = 1100° C. |
| $Fe_{51}Mn_{10}Cr_4Mo_{12}Tm_2C_{15}B_6$ | 7 mm; $T_g$ = 530° C.; $T_l^{onset}$ = 1070° C.; $T_l^{peak}$ = 1105° C. |
| $Fe_{51}Mn_{10}Cr_4Mo_{12}Tb_2C_{15}B_6$ | 6 mm; $T_g$ = 530° C.; $T_l^{onset}$ = 1060° C.; $T_l^{peak}$ = 1100° C. |
| $Fe_{48}Cr_{13}Mn_2Mo_{14}Er_2C_{15}B_6$ | 7 mm; $T_g$ = 575° C.; $T_l^{onset}$ = 1105° C.; $T_l^{peak/f}$ = 1170° C. |
| $Fe_{48}Cr_{15}Mo_{14}Er_2C_{15}B_6$ | 12-13 mm; Tg = 570° C.; $T_l^{onset}$ = 1100° C.; $T_l^{peak/f}$ = 1160° C. |
| $Fe_{50}Cr_{15}Mo_{12}Er_2C_{15}B_6$ | 8 mm; Tg = 565° C.; $T_l^{onset}$ = 1105° C.; $T_l^{peak/f}$ = 1160° C. |
| $Fe_{52}Cr_{15}Mo_9Er_3C_{15}B_6$ | 6 mm; $T_g$ = 535° C.; $T_l^{onset}$ = 1105° C.; $T_l^{peak/f}$ = 1170° C. |
| $Fe_{48}Cr_{15}Mo_{14}Dy_2C_{15}B_6$ | 11 mm; $T_g$ = 570° C.; $T_l^{onset}$ = 1105° C.; $T_l^{peak/f}$ = 1165° C. |
| $Fe_{48}Cr_{15}Mo_{14}Y_2C_{15}B_6$ | 10 mm; $T_g$ = 570° C.; $T_l^{onset}$ = 1105° C.; $T_l^{peak/f}$ = 1170° C. |
| $Fe_{48}Cr_{15}Mo_{14}Lu_2C_{15}B_6$ | 11 mm; $T_g$ = 570° C.; $T_l^{onset}$ = 1105° C.; $T_l^{peak/f}$ = 1170° C. |

For alloys with 14.5-16% C and 6.5-6.0% B, and which also contain the heavier lanthanide elements, the effects on sample size due to large atom additions are summarized as follows:

$$Fe_{100-a-b-c-d-e}Mn_aCr_bMo_cQ_d(C,B)_e$$

4 mm-diameter or larger amorphous rods are obtained in the compositional domain wherein 12≥a≥0, 16≥b≥0, 16≥c+d≥11, 3≥d≥1, 55>a+b+c+d+e>45; 6 mm-diameter or larger amorphous samples are obtained in the compositional domain wherein10≥a0, 16≥b≥4, 14≥c+d≥11, 3≥d≥2, 54>a+b+c+d+e>46; and 7 mm-diameter or larger amorphous samples are obtained in the compositional domain wherein 2≥a≥0, 16≥b≥11, 14≥c+d≥11, 3≥d≥2, 53>a+b+c+d+e>47.

The maximum attainable thicknesses for Cr-rich Glass101, when alloyed with the lighter lanthanide elements, are 1.5 mm, 2.5 mm, 3 mm, 5 mm, and 6 mm for La, Nd, Eu, Ce, and Sm, respectively. Much of the latter results can be explained by noting that the actual amounts of lanthanide detected in these lighter lanthanide bearing alloys are significantly lower than the nominal lanthanide contents originally added. Apparently, the majority of the lanthanide contents form volatile oxides that evaporate from the melt.

Several features are noted in the investigated DARVA-Glass101 alloy series. Both $T_l^{onset}$ & $T_l^{peak}$ are seen to increase slightly with Cr content. $T_l^{onset}$ is seen to decrease slightly with 2-3 at. % of lanthanide additions. Meanwhile, $T_g$ also rises with increasing Cr content, as illustrated in Table 1. The optimal contents of Y and the lanthanides for forming large size rods are at 2 to 3 at. %. Finally, the as-cast rod diameters of some of the alloys listed in Table 1 do not necessarily represent the maximum size attainable. This is because for these alloys, larger size rods have not been cast.

Figure 4A:
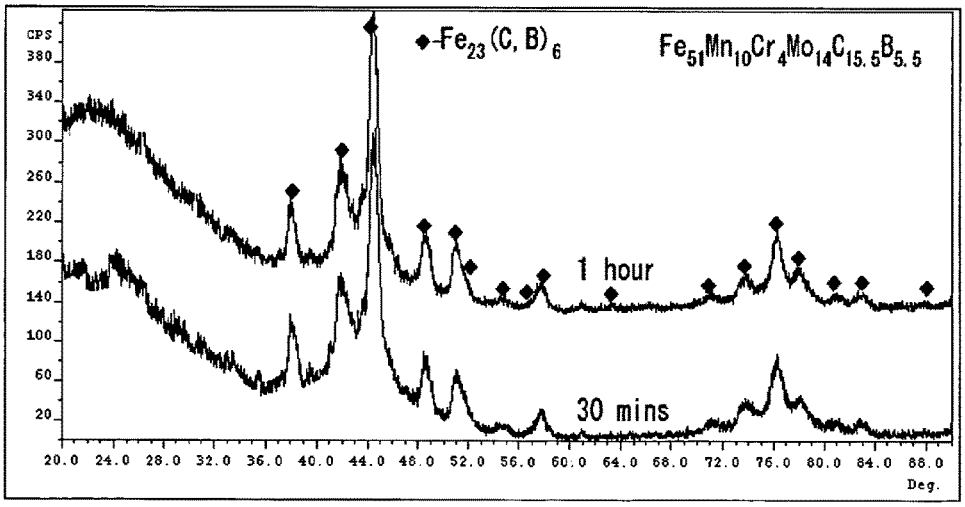
FIGS. 4A and 4B illustrate x-ray diffraction pattern from exemplary samples of DARVA-Glass1 (FIG. 4A) and DARVA-Glass101 (FIG. 4B) for the same annealing time and temperature.
Figure 4B:
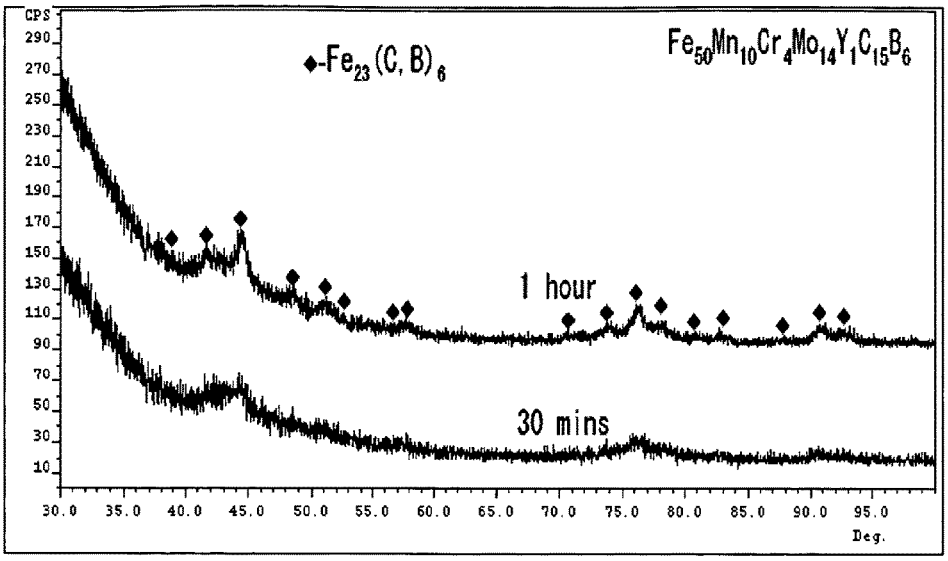

Based on DTA measurements and devitrification studies, a plausible mechanism of high glass formability in DARVA-Glass101 is proposed. From Table 1, it is demonstrated that the significant improvement in the glass formability upon adding the large-atom metals to DARVA-Glass1 to form DARVA-Glass101 is evidently not attributable to the $T_g$ or $T_{rg}$ values observed. This is because the change in $T_g$ is not systematic upon adding large-atom metals to the high-Mn alloys, and $T_{rg}$ remains at 0.6. As for the high-Cr alloys, $T_{rg}$ is even lower at 0.58. Meanwhile, devitrification studies have provided some clues for understanding the enhanced glass formability. DARVA-glass101 is seen to exhibit a higher stability against crystallization than Glass1, as can be seen in FIG. 4. Comparing with DARVA-Glass1, the crystallization of 101 in forming the $Cr_{23}C_6$-phase (cF116 structure) is much delayed upon annealing both Glasses near the onset of their similar crystallization temperatures $T_x$. The more sluggish crystallization kinetics of Glass 101 may be attributed to the fact that the large-atom metals that are encaged inside the amorphous structure must be rejected from the glass during the nucleation and growth of the $Cr_{23}C_6$-phase. If confirmed, the latter scenario would lend evidence to the mechanism of enhanced glass formability from the melt via destabilization of the crystalline phase.

Regarding the DARVA-Glass201 MnLgB-amorphous steel alloys, these alloys are given by the formula (in atomic percent) as follows:

$$Fe_{100-a-b-c-d-e}(Mn, Cr)_a(Nb,Ta,Mo)_bQ_cB_dSi_e$$

wherein Q=Sc, Y and elements from the lanthanide series, and 29≥a≥10, 4≥b≥0, 8≥c≥4, 21≥d≥17, 4≥e≥0, with the proviso that the sum of d and e is no more than 23, Fe content is at least about 45, Mn content is at least 10, and Cr content is less than 4. The alloy composition can further be modified by substituting up to 20% Fe with Ni.

Figure 5A:
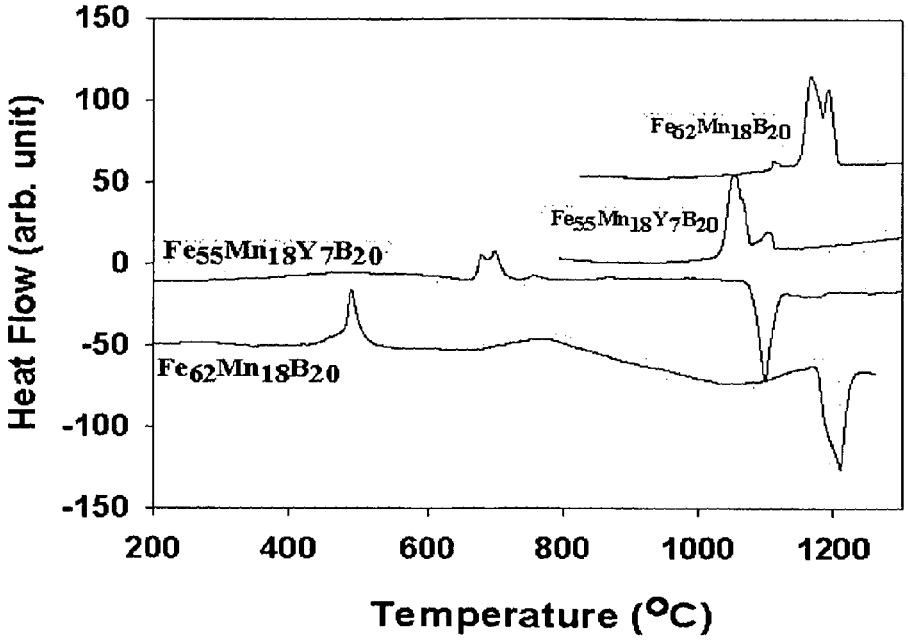
FIG. 5A & 5B illustrate differential thermal analysis plots obtained at scanning rate of 10° C./min showing glass transition, crystallization, and melting in several exemplary amorphous steel alloys of DARVA-Glass201. The partial trace is obtained upon cooling.
Figure 5B:
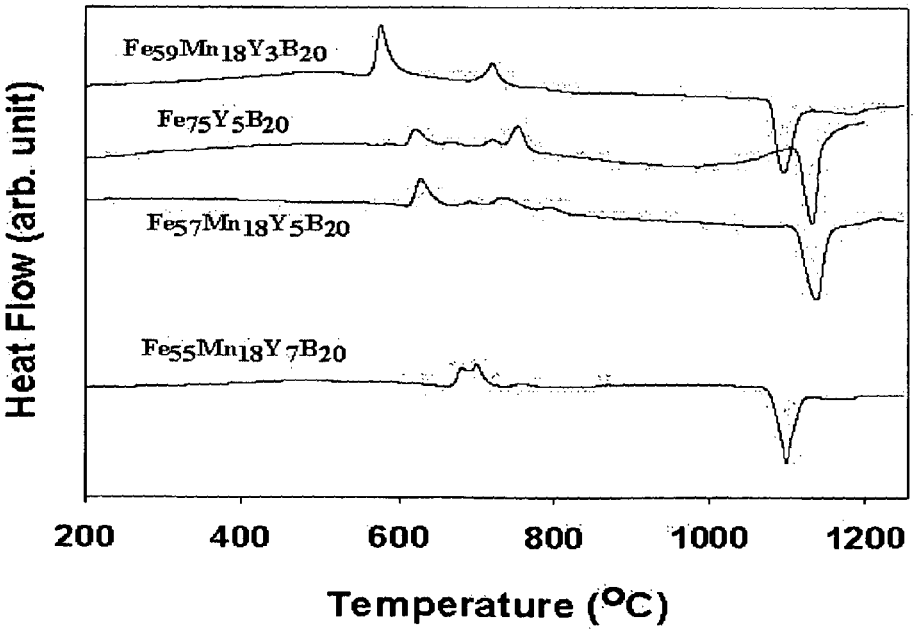

These alloys are found to exhibit a glass temperature $T_g$ of about 520-600° C. (or greater), $T_{rg}$ ~0.58-0.61 (or greater) and supercooled liquid region $\Delta T_x$ of about 40-60° C. (or greater). DTA scans obtained from typical samples are shown in FIGS. 5A and 5B. These alloys can be processed into shapes over a selected range of thickness. For example, in some embodiments the present invention alloys are processable into bulk amorphous samples with a range thickness of at least 0.1 mm or greater. The compositional range expressed in the above formula can yield a sample thickness of at least 1 mm or greater. In one embodiment, the MnLgB alloys can be readily cast into amorphous rods of diameter of 4 mm.

The full potential of these alloys as processible amorphous steel alloys can be further exploited by employing more advanced casting techniques such as high-pressure squeeze casting. Continuous casting methods can also be utilized to produce sheets and strips. A variety of embodiments representing a number of typical amorphous steel alloys of the MnLgB class together with the typical diameter of the bulk-solidifying amorphous cylinder-shaped samples obtained and transformation temperatures are listed in Table 2A. Table 2B lists additional representative alloys and the typical sample sizes attainable. These exemplary embodiments are set forth for the purpose of illustration only and are not intended in any way to limit the practice of the invention.

TABLE 2A

Transformation temperatures of typical DARVA-Glass201 MnLgB-class amorphous steel alloys and diameter of bulk-solidifying cylinder-shaped amorphous samples obtained.

| Alloy Composition | $T_g$ (° C.) | $T_x$ (° C.) | $T_l$ (° C.) | Amorphous Rod Diameter (mm) |
|---|---|---|---|---|
| $Fe_{62}Mn_{18}B_{20}$ | — | 470 | 1180 | — |
| $Fe_{55}Mn_{18}Y_{10}B_{17}$ | — | 680 | 1100 | — |
| $Fe_{59}Mn_{18}Y_3B_{20}$ | 520 | 560 | 1130 | — |
| $Fe_{57}Mn_{18}Y_5B_{20}$ | 560 | 610 | 1130 | 2.0 |
| $Fe_{55}Mn_{18}Y_7B_{20}$ | — | 665 | 1120 | 1.0 |
| $Fe_{55}Mn_{18}Nb_2Y_5B_{20}$ | 580 | 630 | 1120 | 3.5 |
| $Fe_{54}Mn_{18}Nb_2Y_6B_{20}$ | 590 | 650 | 1120 | 3.0 |
| $Fe_{48}Mn_{25}Nb_2Y_5B_{20}$ | 575 | 630 | 1110 | 3.0 |
| $Fe_{50}Mn_{23}Nb_2Y_5B_{20}$ | 580 | 640 | 1110 | 4.0 |
| $Fe_{50}Mn_{23}Mo_2Y_5B_{20}$ | 570 | 625 | 1180 | 3.0 |
| $Fe_{48}Mn_{23}Nb_2Y_5B_{20}Si_2$ | 600 | 660 | 1150 | 3.5 |
| $Fe_{40}Ni_{18}Mn_{15}Nb_2Y_5B_{20}$ | 550 | 593 | 1180 | 1.5 |

TABLE 2A

Additional DARVA-Glass201 alloyse cross-sectional size of amorphous samples.

| Alloy Composition | Amorphous Rod Diameter (mm) |
|---|---|
| $Fe_{59}Mn_{18}Y_5B_{18}$ | 1.0 |
| $Fe_{54}Mn_{18}Y_8B_{20}$ | 1.0 |
| $Fe_{56}Mn_{18}Y_4Er_2B_{20}$ | 2.0 |
| $Fe_{54}Mn_{18}Nb_3Y_5B_{20}$ | 1.5 |
| $Fe_{53}Mn_{18}Nb_3Y_6B_{20}$ | 1.5 |
| $Fe_{54}Mn_{18}Nb_2Y_5B_{20}Si_1$ | 3.5 |
| $Fe_{50}Mn_{23}Ta_2Y_5B_{20}$ | 2.0 |
| $Fe_{50}Mn_{23}Nb_2Gd_5B_{20}$ | 3.0 |
| $Fe_{48.5}Mn_{21}Cr_2Nb_2Y_5B_{20}Si_{1.5}$ | 3.5 |

Example 3

Some aspects of the various embodiments provide a bulk-solidifying high manganese non-ferromagnetic amorphous steel alloys and related method of using and making articles (e.g., systems, structures, components, coatings, etc.) of the same. One class is a high manganese-high molybdenum class that contains manganese, molybdenum, and carbon as the principal alloying components. This class of Fe—Mn—Mo—Cr—C—(B) [element in parenthesis is the minority constituent] amorphous alloys are currently known as DARPA Virginia-Glass1 (aka DARVA-Glass1). Another class is a high-manganese class that contains manganese and boron as the principal alloying components. This class of Fe—Mn—(Cr—Mo—(Zr,Nb)—B alloys is known as DARVA-Glass2. By incorporating phosphorus in DARVA-Glass1, the latter is modified to form Fe—Mn—Mo—Cr—C—(B)—P amorphous alloys known as DARVA-Glass102. These bulk-solidifying amorphous alloys can be obtained in various forms and shapes for various applications and utilizations. The largest diameter size of amorphous cylinder samples obtained reaches 4 millimeters. Still further, another aspect provides a highly formable non-ferromagnetic amorphous steel alloys obtained by using large-size atom additions and related method of using and making the same. The addition of large atoms, Y, Er and other lanthanides greatly increases the size of the cylindrical bulk glass diameters that are obtainable, i.e, improves the glass formability. This class of Fe—Mn—Cr—Mo—(Y, lanthanide)-C—B alloys are known as DARVA101. The good processability of these alloys can be attributed to the high reduced glass temperature $T_{rg}$ (e.g., about 0.6 to 0.63) and large supercooled liquid region $\Delta T_x$ (e.g., about 50-100° C.). On aspect is to utilize these amorphous steels as coatings, rather than strictly bulk structural applications. In this fashion any structural metal alloy can be coated by various technologies by these alloys for protection from the environment. Although results for only several candidate alloys are presented in this disclosure, all chemistry ranges listed in prior disclosures concerning DARVA amorphous steel alloys are claimed.

Figure 6:
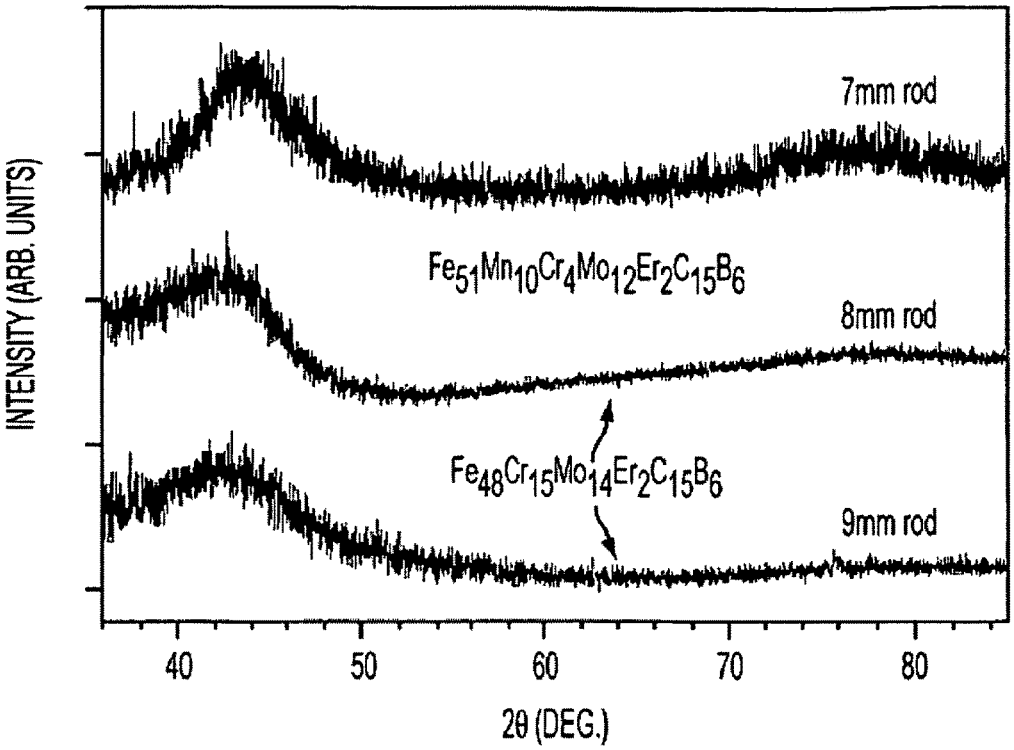
FIG. 6 illustrates an x-ray diffraction pattern from exemplary sample pieces each of total mass about 1 gm obtained by crushing as-cast rods of the present invention DARVA-Glass101 amorphous steel alloy.

Similarly, various aspects provide a new approach for significantly improving the corrosion and wear resistance of metallic-based coatings. The products that result from the present invention approach provides a novel series of non-ferromagnetic amorphous alloys at ambient temperature and related method of using and making articles (e.g., systems, structures, components) of the same. The unique chemistries involved in producing the amorphous alloy coatings are disclosed herein. Conventional methods can be employed to apply the coating to a substrate or the like. The unique compositions readily form bulk glasses so coatings that are amorphous can be readily achieved. Regarding the glass formability and processability, the amorphous nature of the alloy is confirmed by x-ray and electron diffraction as well as thermal analysis, as shown in FIG. 6. Owing to the high glass formability and wide supercooled liquid region, the invention DARVA-Glasses can be produced into various forms of amorphous alloy products, such as thin ribbon samples by melt spinning, amorphous powders by atomization, consolidated products, amorphous rods, thick layers by any type of advanced spray forming for coatings. Accordingly, the aspects of the various embodiments of the present invention of amorphous steel coatings outperform current steel alloys without coatings in many application areas that require corrosion, wear and erosion protection. Some products and services of which the present invention can be implemented includes, but is not limited thereto 1) ship, submarine (e.g., watercrafts), and vehicle (land-craft and aircraft) frames and parts, 2) building structures, 3) armor penetrators, armor penetrating projectiles or kinetic energy projectiles, 4) protection armors, armor composites, or laminate armor, 5) engineering, construction, and medical materials and tools and devices, 6) corrosion and wear-resistant coatings, 7) cell phone and personal digital assistant (PDA) casings, housings and components, 8) electronics and computer casings, housings, and components, 9) magnetic levitation rails and propulsion system, 10) cable armor, 11) hybrid hull of ships, wherein "metallic" portions of the hull could be replaced with steel having a hardened non-magnetic coating according to the present invention, 12) composite power shaft, 13) actuators and other utilization that require the combination of specific properties realizable by the present invention amorphous steel alloys.

Example 4

Corrosion Tests Of Amorphous Steel Alloys

1. Test Conditions:

(a) Sample Preparation Method

Bulk rods were sealed in EPO-THIN low viscosity epoxy (resin+hardener). Nickel wire was pasted on one end of the rod using silver adhesive serving as electric connection. The cross section of rod was first ground using SiC paper discs up to US grit size 1200, then polished using $Al_2O_3$ or diamond suspensions down to 0.05 μm particle size. After each test, the cross section was reground and repolished so that the influence of the previous test can be ignored in the following corrosion test.

Optical Microscopy was used for examining and comparing the cross sections of rods before/after tests.

(b) Experiment Types and Parameters

Corrosion tests have been performed in three representative solutions with different pH values, i.e., pH=6.5 (~neutral), pH=1.0 (acid), and pH=11.0 (base). Appropriate amount of NaCl was added in solutions to produce a same $Cl^-$ concentration of 0.6 M (0.6 Molar/Liter). In each solution, typical tests performed for each sample included: open circuit test (OCP), linear polarization (LP), and cyclic polarization (CP). Nitrogen was used to drive away oxygen in solution for at least one hour before tests, and this deaeration process also remained on during the test. Important experiment parameters were kept same or close for reasonable comparison. For each composition, multiple tests were performed for each pH value and each test type to obtain reliable data, See Table 3. For those rods with irregular cross section, the accuracy of the measured sample area is restricted, but the results are repeatable.

TABLE 3

Number of different types of corrosion tests (OCP, LP, CP) performed in different solutions (pH = 1, 6.5, 11).

| | ID | | | | | | | | | | | | | | | | | |
|---|---|---|---|---|---|---|---|---|---|---|---|---|---|---|---|---|---|---|
| | Fe03-507 | | | Fe03-2/ Fe03-400 | | | Fe03-284 | | | Fe03-630 | | | Fe04-084 | | | Fe04-631 | | |
| pH | OCP | LP | CP | OCP | LP | CP | OCP | LP | CP | OCP | LP | CP | OCP | LP | CP | OCP | LP | CP |
| 1 | 5 | 1 | 5 | 2 | 2 | 2 | 2 | 2 | 2 | 4 | 4 | 4 | 1 | 1 | 1 | 2 | 2 | 2 |
| 6.5 | 3 | 1 | 3 | 3 | 1 | 3 | 2 | 2 | 2 | 4 | 4 | 4 | 2 | 2 | 2 | 2 | 2 | 2 |
| 11 | 4 | 4 | 4 | 4 | 4 | 4 | 1 | 1 | 1 | 1 | 1 | 1 | 3 | 3 | 3 | 2 | 2 | 2 |

Notes:

Fe03507: $Fe_{51}Mn_{10}Cr_4Mo_{14}C_{15}B_6$

Fe03284: $Fe_{48}Cr_{15}Mo_{14}Er_2C_{15}B_6$

Fe04084: $Fe_{50}Cr_{15}Mo_{14}C_{15}B_6$

Method Introduction (a) From Open Circuit Potential (OCP) measurement, we obtain open circuit potential in different solutions.

(b) From Linear Sweep (Linear Polarization over small voltage range, typically 20 mV below OCP to OCP), we can obtain polarization resistance $R_p$.

(c) From Cyclic Polarization tests, we can obtain pitting potential $E_{pit}$, repassivation potential $E_{repass}$, Tafel slopes ($\beta_a$, $\beta_c$) $E_{corr}$ and $i_{corr}$. Data analyses are by (1). Tafel Fitting, which may not be suitable for cases where obvious anodic passivation occurs since this method is assumed to be hold only in active region (activation polarization) of both cathodic and anodic polarizations. (2) In cases where no obvious pitting and repassivation processes occur, we define the pitting and repassivation potentials at a certain current density (for example, $10^{-4}$ A/cm$^2$, depending on the alloys). Otherwise we obtain the pitting and repassivation potentials from the straight-forward positions (where dE/di~0).

(d) We define B=(βaβc)/(2.3(βa+βc)), and the $i_{corr}$ should be able to calculated according to the following equation:

$$i_{corr} = \frac{B}{R_p S_{area}}$$

Special attention should be paid to the units of different parameters. Ideally, this calculated $i_{corr}$ should be close to the one obtained from Tafel fitting, given that the polarizations are suitable for Tafel fitting (active region, see above). But significant deviation could appear if the polarization process shows obvious passivation stage (in this case, doing Tafel fitting itself is questionable).

(e) From this calculated $i_{corr}$ we can estimate the corrosion rate (typically μm/year is used for all alloys in this disclosure). During the calculation, only ionization of Fe occurs. The problem becomes very complicate if we consider all elements such as Mn, Mo, Cr, C and B, etc. This simplification would not influence the magnitude significantly since Fe dominates in all compositions and other elements are less active than Fe.

(f) Typically, we may mostly be interested in the following important parameters: corrosion rate (reflected by $i_{corr}$, the smaller the better), pitting potential (the higher the better), the difference between the pitting potential and the open circuit potential $E_{oc}$ (the larger the better). And, it's certainly helpful to know the pH dependence of the above parameters under current $Cl^-$ concentration.

Corrosion Rate Evaluation Method Used in this Disclosure:

Consider a major oxidation (anodic) reaction, $A \rightarrow A^{n+} + ne^-$; We have, $$I = \frac{\frac{dS_o\rho}{M} nN_0 e}{t}; \quad (1)$$

where I is the current, d the corrosion depth, $S_0$ the cross section area, ρ the density of metal A, M the molar mass of metal A, n is the number of electrons lost in the major anodic reaction, $N_o$ the Avogadro constant, e the charge of an electron, t the time. And we have $N_o e = F$ (Faraday constant, 96487 Coulomb/mole). Define average corrosion rate as $\chi = d/t$, then $$\chi = d/t = \frac{iM}{n\rho F}, \quad (2)$$

where $i = I/S_0$ is the current density in unit of A/cm$^2$, which is calculated using parameters extracted from Tafel Fit (CP tests) and Rp Fit (LP tests). Using density in unit of g/cm$^3$, we will have corrosion rate in unit of cm/sec, which can be converted to other units such as μm/year.

For alloys, simplifications are required to get the corrosion rate. The simplest one is assuming only the dominating element is dissolved.

1. Corrosion Results (a) Fe03507: $Fe_{51}Mn_{10}Cr_4Mo_{14}C_{15}B_6$

Figure 7:
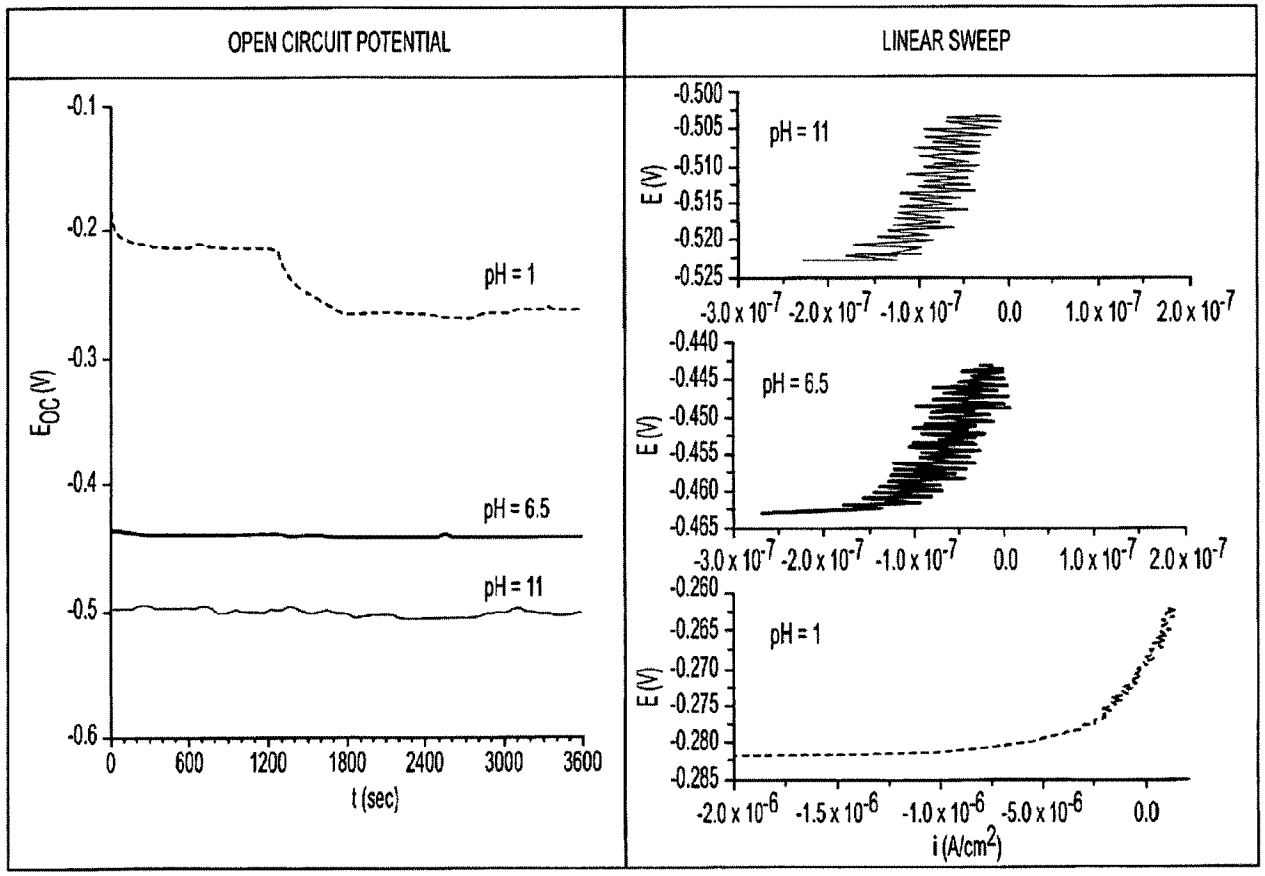
FIG. 7 graphically provides Open Circuit Potential (OCP) and Linear Sweep Polarization (LP) for alloy $Fe_{51}Mn_{10}Cr_4Mo_{14}C_{15}B_6$.

Referring to FIG. 7, FIG. 7 graphically provides Open Circuit Potential (OCP) and Linear Sweep Polarization (LP) for alloy $Fe_{51}Mn_{10}$ $Cr_4Mo_{14}C_{15}B_6$. It should be noted the large fluctuation of potential during linear polarization (LP) tests is an indicator of "passivation," which is consistent with CP tests, i.e., in acid solution, the chance of passivation for this alloy is less.

Figure 8:
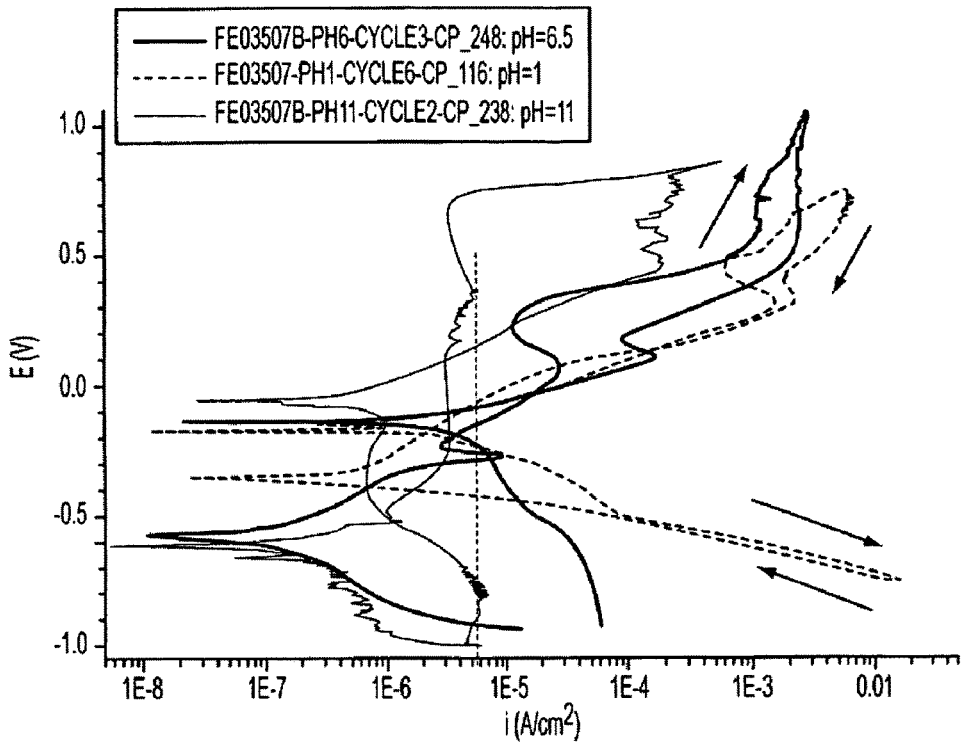
FIG. 8 graphically provides cyclic potential (CP) results for alloy $Fe_{51}Mn_{10}Cr_4Mo_{14}C_{15}B_6$ in basic, neutral and acidic solutions.
Figure 9A:
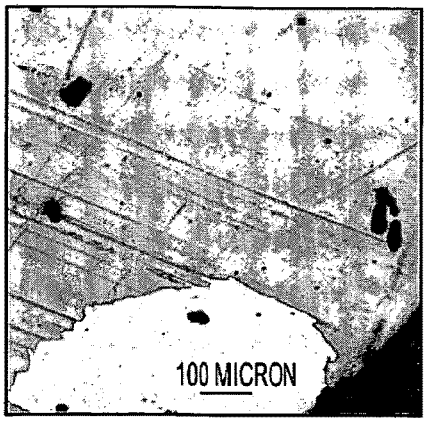
FIGS. 9A, 9B, 9C and 9D provide depictions of optical microscope images of sample surface for alloy $Fe_{51}Mn_{10}Cr_4Mo_{14}C_{15}B_6$ in basic, neutral and acidic solutions following CP tests.
Figure 9B:
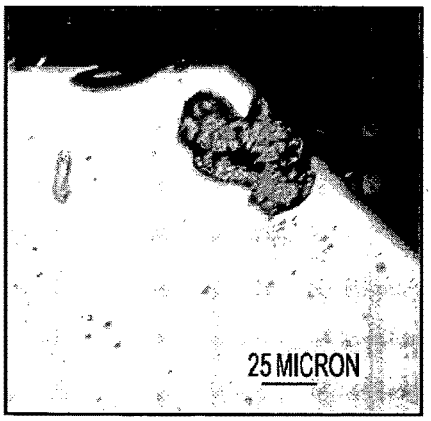
Figure 9C:
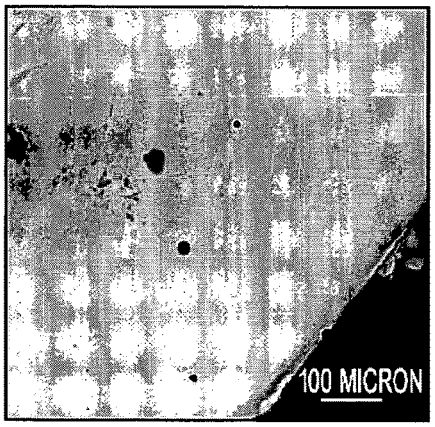
Figure 9D:
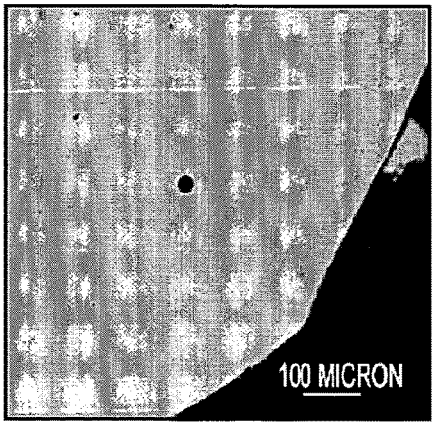

Referring to FIG. 8, FIG. 8 graphically provides cyclic potential (CP) results for alloy $Fe_{51}Mn_{10}Cr_4Mo_{14}C_{15}B_6$ in basic, neutral and acidic solutions. The corrosion behavior changes with pH value systematically. In acid solution (dashed-line curve), passivation and pitting are the least obvious. In base solution (thin-line curve), passivation (and repassivation) and pitting are very obvious. In neutral solution (dark-line curve), things are somewhere in between the two extremes. (See Data comparison shown in Table 4).

Optical Microscopy:

FIG. 9 provides depictions of optical microscope images of sample surface for alloy $Fe_{51}Mn_{10}Cr_4Mo_{14}C_{15}B_6$ in basic, neutral and acidic solutions following CP tests. The FIG. 9 photos are taken after pH=1, after pH=11, before pH6.5 and after pH=6.5 CP tests, clockwise from upper left. Notes: After CP test in acid solution, a thin brown layer formed on the surface, together with a few pits. This layer can be wiped off. After CP test in base solution, almost no changes on the sample surface can be observed under optical microscopy, except at a few places along the sample-resin interface (edge), "crystal-like" particles can be seen. After CP test in pH=6.5 NaCl solution, the surface is similar as the one after test in acid solution, except that the number of pits and the corrosion layer are much less.

What described above regarding FIG. 9 is universal for alloys with similar compositions. The surface changes before/after CP tests are consistent with what we have seen in CP curves. For example, due to the passivation in base solution, the surface has less change, while in acid solution, the continuously increased current may produce the brown layer (e.g., $Fe(OH)_2$).

(b) Fe03284: $Fe_{48}Cr_{15}Mo_{14}Er_2C_{15}B_6$

Figure 10:
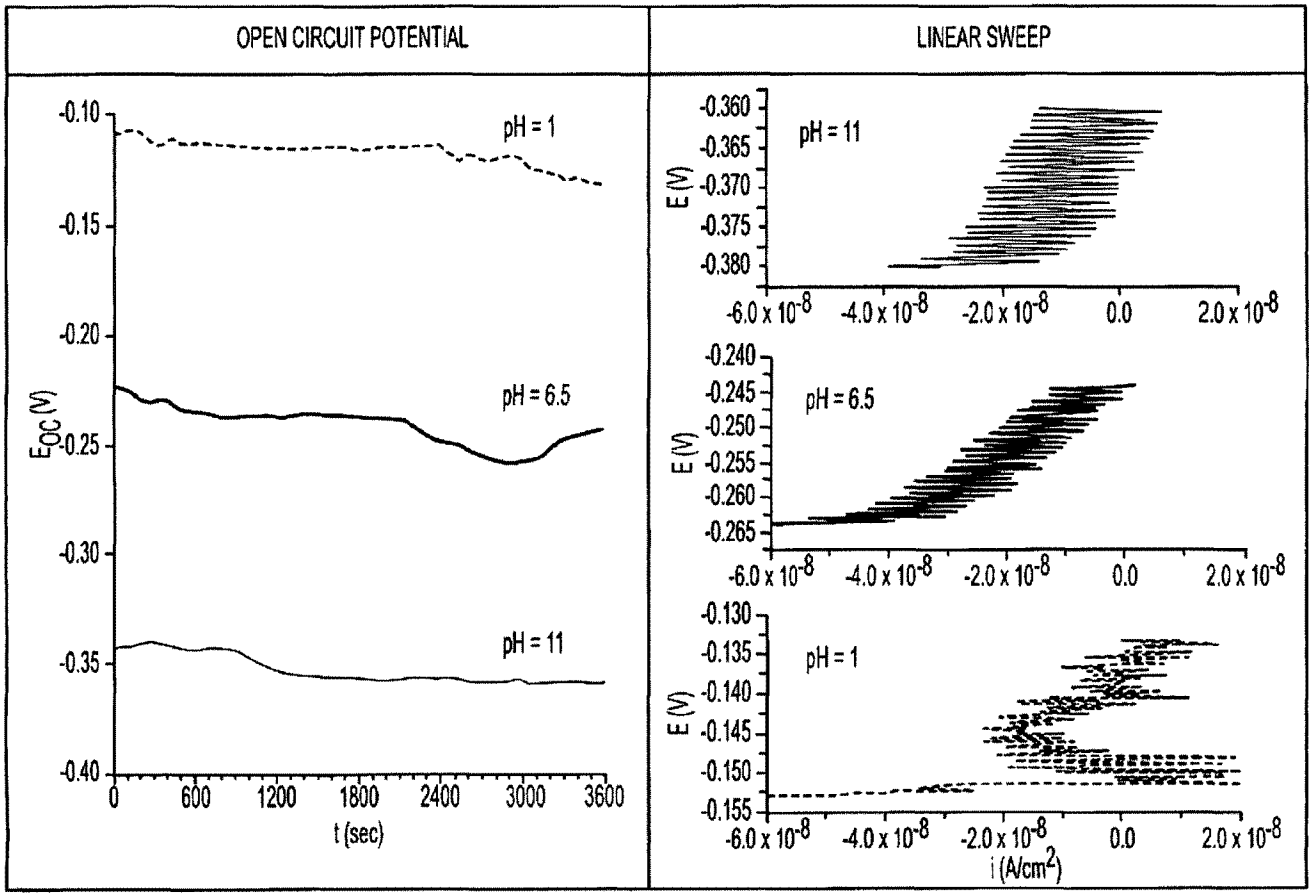
FIG. 10 provides a graphical Open Circuit Potential (OCP) and Linear Sweep Polarization (LP) for alloy $Fe_{48}Cr_{15}Mo_{14}Er_2C_{15}B_6$.

FIG. 10 provides a graphical Open Circuit Potential (OCP) and Linear Sweep Polarization (LP) for alloy $Fe_{48}Cr_{15}Mo_{14}Er_2C_{15}B_6$. Similarly as Fe03507, the passivation tendency increases with the increasing pH value, and the open circuit potential decreases with the increasing pH values.

Figure 11:
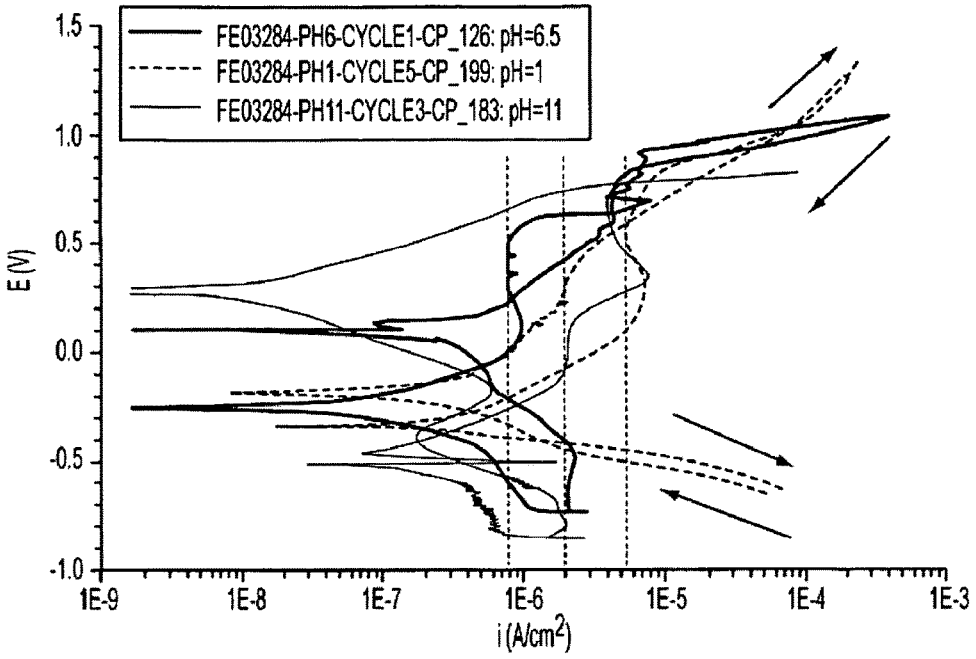
FIG. 11 provides a graphical Cyclic potential (CP) results for alloy $Fe_{48}Cr_{15}Mo_{14}Er_2C_{15}B_6$ in basic, neutral and acidic solutions.

FIG. 11 provides a graphical Cyclic potential (CP) results for alloy $Fe_{48}Cr_{15}Mo_{14}Er_2C_{15}B_6$ in basic, neutral and acidic solutions. The changing tendency of CP curves with pH values is similar as Fe03507. But the current density is smaller in this case (comparing x-axis). This reflects smaller corrosion rate, due to the increased Cr amount, see Data comparison shown in Table 4.

Figure 12A:
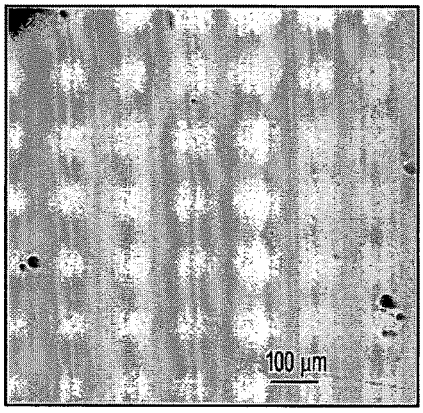
FIGS. 12A and 12B depict depicts optical microscope images of sample surface for alloy $Fe_{48}Cr_{15}Mo_{14}Er_2C_{15}B_6$ before and after CP at pH 6.5.
Figure 12B:
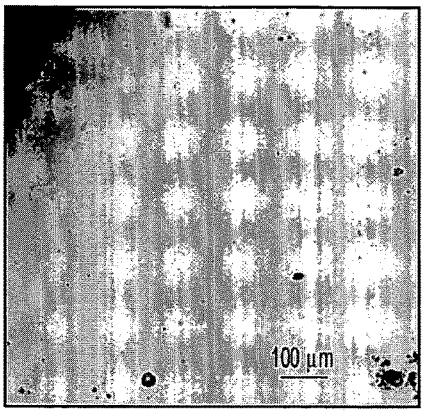

FIG. 12 depicts optical microscope images of sample surface for alloy $Fe_{48}Cr_{15}Mo_{14}Er_2C_{15}B_6$ before and after CP at pH 6.5. The relation between the degree of surface changes and pH values is similar as Fe03507. For example, very limited amount of pits appear. Sample edge may show features like crystalline particles. This big rod (4 mm) has a couple of intrinsic holes, which cannot be removed by grinding/polishing. Because of the small corrosion current (resulted from high Cr amount), no surface corrosion layer (the color of this layer depends on the corrosion product of different Fe-compounds) was seen even after CP tests in acid solution.

Next, in can be noted that corrosion rate of Fe-based alloys decreases with increasing pH value of solution (under current $Cl^-$ concentration). The accuracy of the data is expected within {0.1×corrosion_rate, 10×corrosion_rate}, for example, if a corrosion rate of 1 μm/y is shown, it could vary between 0.1 to 10 μm/y, which is the best estimate using current method. As discussed in the method introduction part, Tafel fitting can not be very suitable when passivation-like behavior appears during anodic polarization. Also because of this problem, the corrosion rates of pure elements shown below are less accurate. So, data of pure elements are only given for future evaluation of the validity of current analysis method.

Comparing Fe03507 with Fe03284, the data are reasonable. Increasing Cr atomic ratio improves the corrosion resistance. Comparing Fe04084 and Fe03284, 2% substitution of Fe by Er significantly improve the corrosion resistance.

Figure 17:
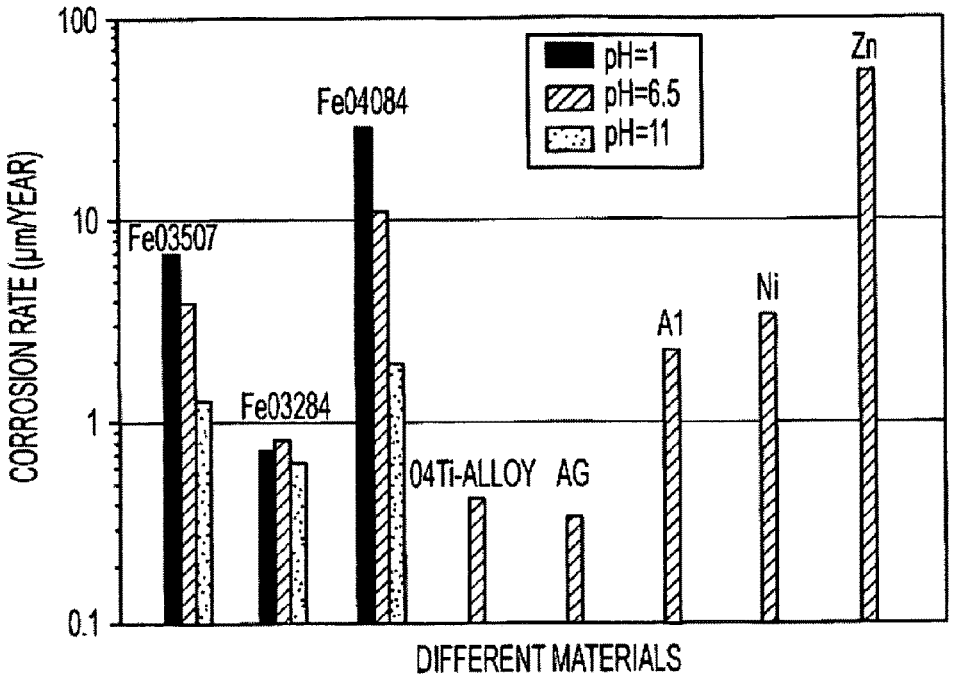
FIG. 17 provides a bar graph illustrating the loss of material per year because of corrosion for a variety of elements at various pH levels.

FIG. 17 provides a bar graph illustrating the loss of material per year because of corrosion for a variety of elements at various pH levels.

| Sample ID | pH | $E_{oc}$ (V) | $E_{corr}$ (V) | $i_{corr}$ (nA/cm$^2$) | $E_{pit}$ (V) | $E_{repass}$ (V) | $E_{pit}$-$E_{oc}$ (V) | χ (μm/year) |
|---|---|---|---|---|---|---|---|---|
| Fe03507: Fe51Mn10Cr4Mo14C15B6* | 1.0 | −0.262 | −0.325 | 594 | −0.06 | 0.09 | 0.202 | 6.89 |
| | 6.5 | −0.442 | −0.563 | 335 | 0.34 | 0.19 | 0.782 | 3.89 |
| | 11.0 | −0.503 | −0.645 | 350 | 0.76 | 0.43 | 1.263 | 1.26 |
| Fe03284: Fe48Cr15Mo14Er2C15B6** | 1.0 | −0.130 | −0.339 | 63 | 0.58 | N/A | 0.710 | 0.73 |
| | 6.5 | −0.243 | −0.264 | 70 | 0.64 | N/A | 0.883 | 0.81 |
| | 11.0 | −0.359 | −0.391 | 55 | 0.77 | N/A | 1.129 | 0.64 |
| Fe04084: Fe50Cr15Mo14C15B6*** | 1.0 | −0.237 | −0.356 | 2554 | −0.15 | N/A | 0.087 | 29.62 |
| | 6.5 | −0.444 | −0.698 | 977 | −0.20 | N/A | 0.244 | 11.33 |
| | 11.0 | −0.327 | −0.562 | 170 | 0.45 | N/A | 0.777 | 1.97 |

*For pH = 11, pitting and repassivation are well defined. For pH = 6.5, pitting defined; repassivation is assumed at 1E-4A/cm$^2$. For pH = 1, pitting and repassivation are assumed at 5.4E-6 A/cm$^2$; repassivation is assumed at 1E-4 A/cm$^2$
**For pH = 1, pitting is assumed at 5.4E-6 A/cm$^2$; no obvious repassivation for all solutions. Instead, almost overlapped at reverse point (hysterias loop is small or ~zero)
***For pH = 1, define pitting at 5.4E-6 A/cm$^2$; no obvious pitting for acid solution; no obvious re-passivation for all solutions.

(c) Fe04084: $Fe_{50}Cr_{15}Mo_{14}C_{15}B_6$

Figure 13:
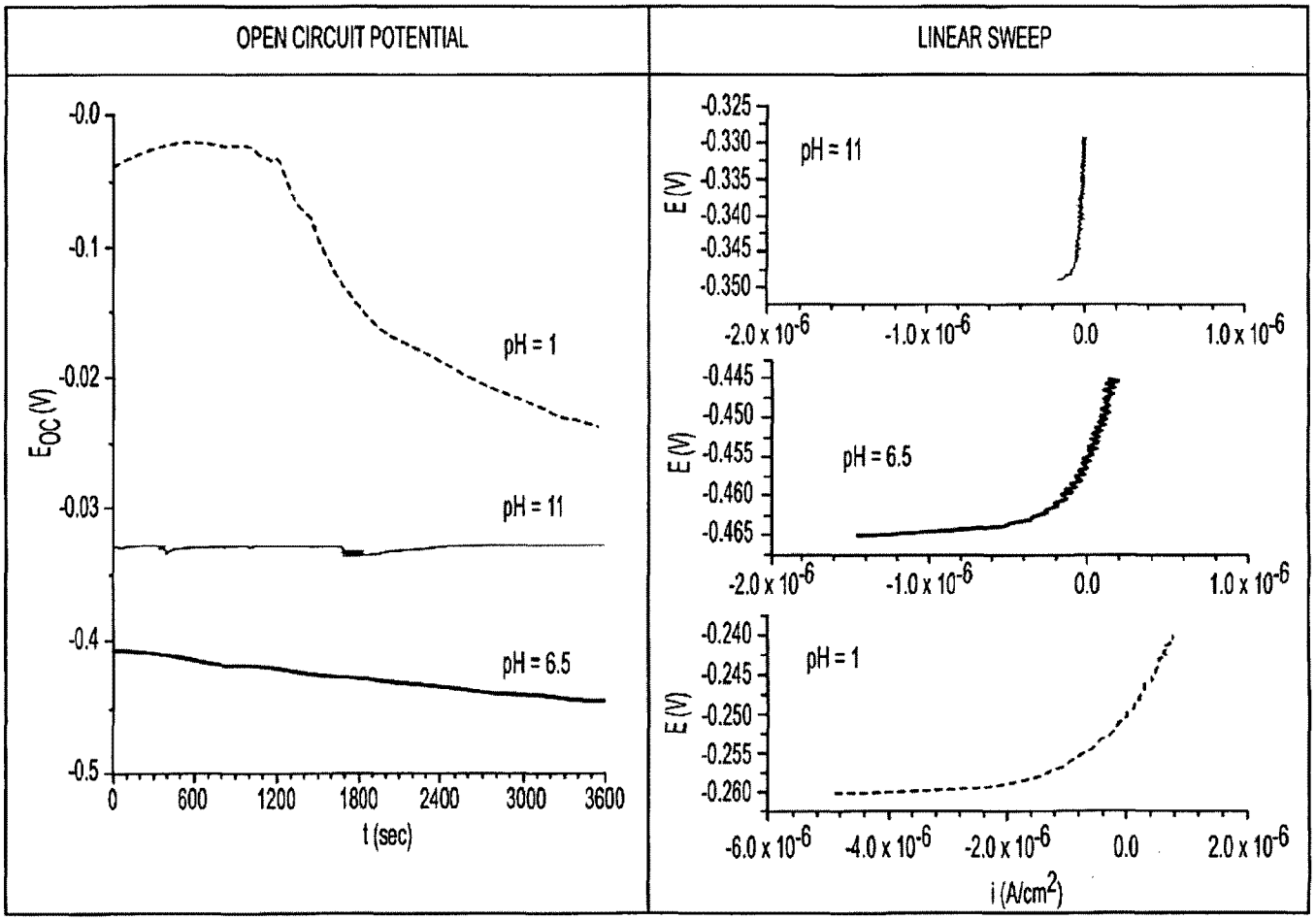
FIG. 13 provides a graphical Open Circuit Potential (OCP) and Linear Sweep Polarization (LP) for alloy $Fe_{50}Cr_{15}Mo_{14}C_{15}B_6$.

FIG. 13 provides a graphical Open Circuit Potential (OCP) and Linear Sweep Polarization (LP) for alloy $Fe_{50}Cr_{15}Mo_{14}C_{15}B_6$. Similarly, the passivation tendency increases with the increasing pH value. But the open circuit potential-pH relation is not the same as Fe03507 and Fe03284.

Figure 14:
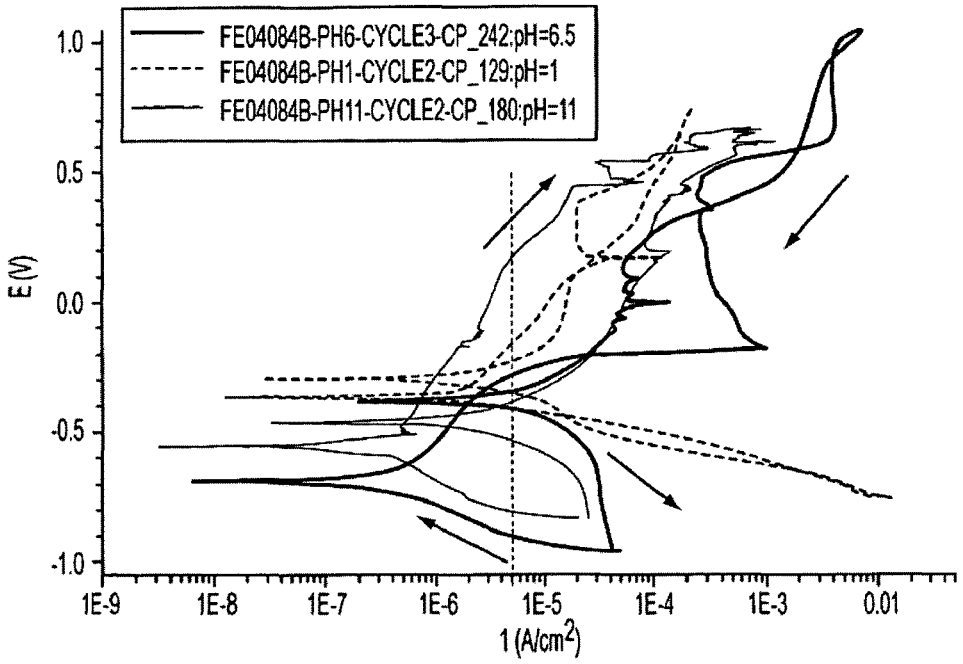
FIG. 14 provides a graphical Cyclic potential (CP) results for alloy $Fe_{50}Cr_{15}Mo_{14}C_{15}B_6$ in basic, neutral and acidic solutions.

FIG. 14 provides a graphical Cyclic potential (CP) results for alloy $Fe_{50}Cr_{15}Mo_{14}C_{15}B_6$ in basic, neutral and acidic solutions.

Figure 15A:
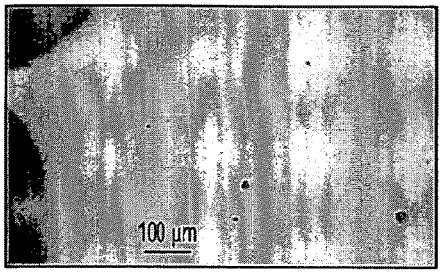
FIGS. 15A and 15B depict Optical microscope images of sample surface for alloy $Fe_{50}Cr_{15}Mo_{14}C_{15}B_6$ before and after CP at pH 6.5.
Figure 15B:
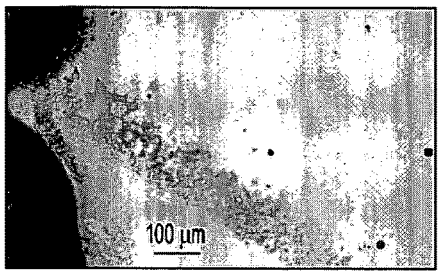

FIG. 15 depicts Optical microscope images of sample surface for alloy $Fe_{50}Cr_{15}Mo_{14}C_{15}B_6$ before and after CP at pH 6.5. Surface change is also not large. Limited amount of pits and layer appear, particularly near edge.

Figure 16A:
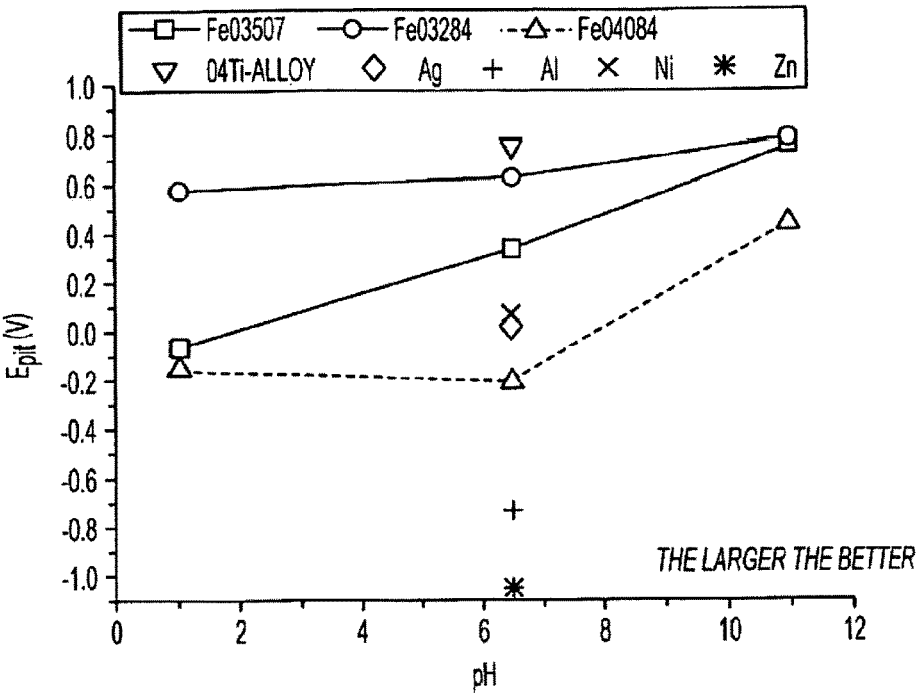
FIGS. 16A and 16B graphically provide pitting potential and the difference between pitting potential and open circuit potential vs pH for the three different amorphous steels discussed in this disclosure. Also compared with some common metal elements.
Figure 16B:
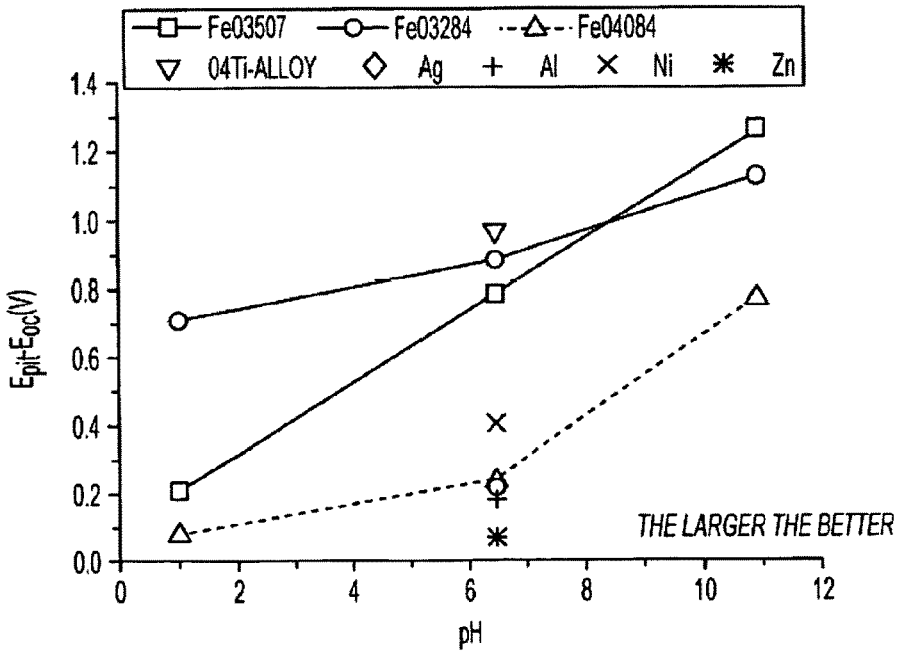

FIG. 16 graphically provides pitting potential and the difference between pitting potential and open circuit potential vs pH for the three different amorphous steels discussed in this disclosure. Also compared with some common metal elements.

Provided is the pitting potential and the difference between pitting potential and open circuit potential vs pH for different materials. It can be noted that the larger these quantities, the more difficult for this material to corrode under the similar environments.

The various embodiments of the present invention material, structures, method of using and fabrication may be implemented with the embodiments disclosed in the following Patents, patent applications, references and publications as listed below and are hereby incorporated by reference herein in their entirety:

U.S. Pat. No. 4,676,168 to Cotton et al. entitled "Magnetic Assemblies for Minesweeping or Ship Degaussing;"

U.S. Pat. No. 5,820,963 to Lu et al. entitled "Method of Manufacturing a Thin Film Magnetic Recording Medium having Low MrT Value and High Coercivity;"

U.S. Pat. No. 5,866,254 to Peker et al. entitled "Amorphous metal/reinforcement Composite Material;"

U.S. Pat. No. 6,446,558 to Peker et al. entitled "Shaped-Charge Projectile having an Amorphous-Matrix Composite Shaped-charge Filter;"

U.S. Pat. No. 5,896,642 to Peker et al. entitled "Die-formed Amorphous Metallic Articles and their Fabrication;"

U.S. Pat. No. 5,797,443 to Lin, Johnson, and Peker entitled "Method of Casting Articles of a Bulk-Solidifying Amorphous Alloy;"

U.S. Pat. No. 4,061,815 to Poole entitled "Novel Compositions;"

U.S. Pat. No. 4,353,305 to Moreau, et al. entitled "Kinetic-energy Projectile;"

U.S. Pat. No. 5,228,349 to Gee et al. entitled "Composite Power Shaft with Intrinsic Parameter Measurability;"

U.S. Pat. No. 5,728,968 to Buzzett et al. entitled "Armor Penetrating Projectile;"

U.S. Pat. No. 5,732,771 to Moore entitled "Protective Sheath for Protecting and Separating a Plurality for Insulated Cable Conductors for an Underground Well;" and U.S. Pat. No. 5,868,077 to Kuznetsov entitled "Method and Apparatus for Use of Alternating Current in Primary Suspension Magnets for Electrodynamic Guidance with Superconducting Fields;"

U.S. Pat. No. 6,357,332 to Vecchio entitled "Process for Making Metallic/intermetallic Composite Laminate Material and Materials so Produced Especially for Use in Lightweight Armor;"

U.S. Pat. No. 6,505,571 to Critchfield et al. entitled "Hybrid Hull Construction for Marine Vessels;"

U.S. Pat. No. 6,515,382 to Ullakko entitled "Actuators and Apparatus;"

| | |
|---|---|
| U.S. Pat. No. 5,738,733 | Inoue A. et al. |
| U.S. Pat. No. 5,961,745 | Inoue A. et al. |
| U.S. Pat. No. 5,976,274 | Inoue A. et al. |
| U.S. Pat. No. 6,172,589 | Fujita K. et al. |
| U.S. Pat. No. 6,280,536 | Inoue A. et al. |
| U.S. Pat. No. 6,284,061 | Inoue A. et al. |
| U.S. Pat. No. 5,626,691 | Li, Poon, and Shiflet |
| U.S. Pat. No. 6,057,766 | O'Handley et al. |

U.S. patent application Publication No. US 2005/0034792 A1 (Ser. No. 10/639,277) to Lu et al.

U.S. patent application Publication No. US 2004/00154701 A1 (Ser. No. 10/364,988) to Lu et al.

"Synthesis and Properties of Ferromagnetic Bulk Amorphous Alloys", A. Inoue, T. Zhang, H. Yoshiba, and T. Itoi, in Bulk Metallic Glasses, edited by W. L. Johnson et al., Materials Research Society Proceedings, Vol. 554, (MRS Warrendale, Pa., 1999), p. 251.

"The Formation and Functional Properties of Fe-Based Bulk Glassy Alloys", A. Inoue, A. Takeuchi, and B. Shen, Materials Transactions, JIM, Vol. 42, (2001), p. 970.

"New Fe—Cr—Mo—(Nb,Ta)—C—B Alloys with High Glass Forming Ability and Good Corrosion Resistance", S. Pang, T. Zhang, K. Asami, and A. Inoue, Materials Transactions, JIM, Vol. 42, (2001), p. 376.

"(Fe, Co)—(Hf, Nb)—B Glassy Thick Sheet Alloys Prepared by a Melt Clamp Forging Method", H. Fukumura, A. Inoue, H. Koshiba, and T. Mizushima, Materials Transactions, JIM, Vol. 42, (2001), p. 1820.

"Universal Criterion for Metallic Glass Formation", T. Egami, Mater. Sci. Eng. A Vol. 226-228, (1997), p. 261.

"Synthesis of iron-based bulk metallic glasses as nonferromagnetic amorphous steel alloys", V. Ponnambalam, S. J. Poon, G. J. Shiflet, V. M. Keppens, R. Taylor, and G. Petculescu, Appl. Phys. Lett. Vol. 83, (2003), p. 1131.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, field, background, summary, abstract, drawing figure, etc.) of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Unless clearly specified to the contrary, there is no requirement for any particular described or illustrated activity or element, any particular sequence or such activities, any particular size, speed, material, dimension or frequency, or any particularly interrelationship of such elements. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all sub ranges therein. Any information in any material (e.g., a United States/foreign patent, United States/foreign patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

We claim:

1. An amorphous alloy represented by the formula:

$$Fe_{48}Cr_{15}Mo_{14}Er_2C_{15}B_6$$

and wherein for a test duration said alloy is exposed to an environment having a designated pH level, said alloy is determined to have a differential voltage, V, wherein differential voltage, V, equals $E_{pit}-E_{oc}$, wherein $E_{pit}$ is pitting potential and $E_{oc}$ is open circuit potential, wherein:

said alloy has a voltage differential, V, that is determined to have at least one of the following magnitudes:

if said PH level is equal to about 1.0, then V is equal to about 0.710 if said PH level is equal to about 6.5, then V is equal to about 0.883 and if said PH level is equal to about 11.0, then V is equal to about 1.129.

2. The alloy of claim 1, wherein said alloy is processable into bulk amorphous samples of less than about 0.1 mm in thickness in its minimum dimension.

3. The alloy of claim 1, wherein said alloy is processable into bulk amorphous samples of at least about 0.1 mm in thickness in its minimum dimension.

4. The alloy of claim 1, wherein said alloy is processable into bulk amorphous samples of at least about 0.5 mm in thickness in its minimum dimension.

5. The alloy of claim 1, wherein said alloy is processable into bulk amorphous samples of at least about 1 mm in thickness in its minimum dimension.

6. The alloy of claim 1, wherein said alloy is processable into bulk amorphous samples of at least about 5 mm in thickness in its minimum dimension.

7. The alloy of claim 1, wherein said alloy is processable into bulk amorphous samples of at least about 10 mm in thickness in its minimum dimension.

8. The alloy of claim 1, wherein said alloy is processable into bulk amorphous samples of at least about 12 mm in thickness in its minimum dimension.

9. The alloy of claim 1, wherein said alloy is processable into an article.

10. The alloy of claim 9, wherein said processed article is provided by at least one of the following processing methods: melt spinning, atomization, spray forming, scanning-beam forming, plastic forming, casting, and compaction.

11. The alloy of claim 1, wherein said alloy is processable into a coating.

12. The alloy of claim 11, wherein said processed coating is provided by at least one of the following processing methods: melt spinning, atomization, spray forming, scanning-beam forming, plastic forming, casting, and compaction.

13. The alloy of claim 11, wherein said coating comprises corrosion resistant type coating and/or wear-resistant type coating.

14. The alloy of claim 11, wherein said coating is disposed on a structure selected from the group consisting of ship frames, submarine frames, vehicle frames, airplane walls and frames, ship walls, submarine walls, vehicle walls, armor penetrators, projectiles, protection armors, rods, train rails, cable armor, power shaft, and actuators, hand tools and medical implants and devices, cell phone and PDA casings, housings, and interior components, electronics and computer casings, housings and interior components.

15. The alloy of claim 1, wherein said alloy is processable into a structure selected from the group consisting of ship frames, submarine frames, vehicle frames, ship walls, submarine walls, vehicle walls, armor penetrators, projectiles, protection armors, rods, train rails, cable armor, power shaft, and actuators, hand tools and medical implants and devices, cell phone and PDA casings, housings, and interior components, electronics and computer casings, housings and interior components.

16. The alloy of claim 1, wherein said test duration is less than about 1 hour.

17. The alloy of claim 1, wherein said test duration is about 1 hour.

18. The alloy of claim 1, wherein said test duration is greater than about 1 hour.

19. An amorphous alloy represented by the formula:

$Fe_{50}Cr_{15}Mo_{14}C_{15}B_6$ and wherein for a test duration said alloy is exposed to an environment having a designated pH level, said alloy is determined to have a differential voltage, V, wherein differential voltage, V, equals $E_{pit}-E_{oc}$, wherein $E_{pit}$ is pitting potential and $E_{oc}$ is open circuit potential, wherein:

said alloy has a voltage differential, V, that is determined to have at least one of the following magnitudes:

if said PH level is equal to about 1.0, then V is equal to about 0.087;

if said PH level is equal to about 6.5, then V is equal to about 0.244; and if said PH level is equal to about 11.0, then V is equal to about 0.777.

20. The alloy of claim 19, wherein said alloy is processable into bulk amorphous samples of less than about 0.1 mm in thickness in its minimum dimension.

21. The alloy of claim 19, wherein said alloy is processable into bulk amorphous samples of at least about 0.1 mm in thickness in its minimum dimension.

22. The alloy of claim 19, wherein said alloy is processable into bulk amorphous samples of at least about 0.5 mm in thickness in its minimum dimension.

23. The alloy of claim 19, wherein said alloy is processable into bulk amorphous samples of at least about 1 mm in thickness in its minimum dimension.

24. The alloy of claim 19, wherein said alloy is processable into [hulk] *bulk* amorphous samples of at least about 5 mm in thickness in its minimum dimension.

25. The alloy of claim 19, wherein said alloy is processable into bulk amorphous samples of at least about 10 mm in thickness in its minimum dimension.

26. The alloy of claim 19, wherein said alloy is processable into bulk amorphous samples of at least about 12 mm in thickness in its minimum dimension.

27. The alloy of claim 19, wherein said alloy is processable into an article.

28. The alloy of claim 27, wherein said processed article is provided by at least one of the following processing methods: melt spinning, atomization, spray forming, scanning-beam forming, plastic forming, casting, and compaction.

29. The alloy of claim 19, wherein said alloy is processable into a coating.

30. The alloy of claim 29, wherein said processed coating is provided by at least one of the following processing methods: melt spinning, atomization, spray forming, scanning-beam forming, plastic forming, casting, and compaction.

31. The alloy of claim 29, wherein said coating comprises corrosion resistant type coating and/or wear-resistant type coating.

32. The alloy of claim 29, wherein said coating is disposed on a structure selected from the group consisting of ship frames, submarine frames, vehicle frames, airplane walls and frames, ship walls, submarine walls, vehicle walls, armor penetrators, projectiles, protection armors, rods, train rails, cable armor, power shaft, and actuators, hand tools and medical implants and devices, cell phone and PDA casings, housings, and interior components, electronics and computer casings, housings and interior components.

33. The alloy of claim 19, wherein said alloy is processable into a structure selected from the group consisting of ship frames, submarine frames, vehicle frames, ship walls, submarine walls, vehicle walls, armor penetrators, projectiles, protection armors, rods, train rails, cable armor, power shaft, and actuators, hand tools and medical implants and devices, cell phone and PDA casings, housings, and interior components, electronics and computer casings, housings and interior components.

34. The alloy of claim 19, wherein said test duration is less than about 1 hour.

35. The alloy of claim 19, wherein said test duration is about 1 hour.

36. The alloy of claim 19, wherein said test duration is greater than about 1 hour.

*37. An iron-based bulk-solidifying amorphous alloy comprising at least four elements including Fe, and having the formula Fe—Mn—Cr—Mo—(C, B)-Q, where Q is a large-atom element selected from the group consisting of Sc, Y, Ce, Pr, Nd, Pm, Sm, Eu, Gd, Tb, Dy, Ho, Er, Tm, Yb, and Lu, an amount of Mn is from 10 to 12 atomic %, an amount of chromium is from 0 to 16 atomic %, an amount of Mo is from 8 to 16 atomic %, an amount of (C, B) is greater than 18 atomic %, with an amount of C being at least 13 atomic % and an amount of B being at least 5 atomic %, and an amount of Q is greater than zero and less than or equal to 3 atomic %, and the bulk-solidifying amorphous alloy is non-ferromagnetic at ambient temperature.*

*38. The bulk-solidifying amorphous alloy of claim 37, wherein an amount of Fe is at least 45 atomic %.*

*39. The bulk-solidifying amorphous alloy of claim 37, wherein the bulk-solidifying amorphous alloy has a magnetic transition temperature below ambient temperature.*

*40. The bulk-solidifying amorphous alloy of claim 37, wherein the large-atom element is Y, Gd, Tb, Dy, Ho, Er, Tm, Yb, Lu or combinations thereof.*

*41. The bulk-solidifying amorphous alloy of claim 37, wherein the bulk-solidifying amorphous alloy has a microhardness in the range of about 1000-1300 DPN.*

*42. The bulk-solidifying amorphous alloy of claim 37, wherein the bulk-solidifying amorphous alloy has a fracture toughness in a range of about 3 to 4 GPa.*

*43. The bulk-solidifying amorphous alloy of claim 37, wherein the bulk-solidifying amorphous alloy has a Young's modulus in a range of about 180-210 GPa.*

*44. The bulk-solidifying amorphous alloy of claim 37, wherein the bulk-solidifying amorphous alloy has a bulk modulus in a range of about 140-190 GPa.*

*45. The bulk-solidifying amorphous alloy of claim 37, wherein the bulk-solidifying amorphous alloy has a glass transition temperature of about 530° C. or greater.*

*46. The bulk-solidifying amorphous alloy of claim 37, wherein the bulk-solidifying amorphous alloy has a reduced glass temperature of about 0.58 or greater.*

*47. The bulk-solidifying amorphous alloy of claim 37, wherein the bulk-solidifying amorphous alloy has a supercooled liquid region of about 30° C. or greater.*

*48. The bulk-solidifying amorphous alloy of claim 37, wherein the bulk-solidifying amorphous alloy has a liquidus onset temperature in a range from about 1065° C. to 1105° C.*

*49. The bulk-solidifying amorphous alloy of claim 37, wherein the alloy further comprises 2 atomic % or less of one or elements selected from Ti, Zr, Hf, Nb, V, Ta, W, Al, Ga, In, Sn, Si, Ge, and Sb.*

* * * * *